(12) United States Patent
Gao et al.

(10) Patent No.: US 11,988,814 B2
(45) Date of Patent: May 21, 2024

(54) CAMERA LENS GROUP INCLUDING SEVEN LENSES OF +−+−++−, +−++++− OR +−++−+− REFRACTIVE POWERS

(71) Applicant: Zhejiang Sunny Optics Co., Ltd., Yuyao (CN)

(72) Inventors: Xue Gao, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 653 days.

(21) Appl. No.: 17/165,321

(22) Filed: Feb. 2, 2021

(65) Prior Publication Data

US 2021/0318520 A1 Oct. 14, 2021

(30) Foreign Application Priority Data

Apr. 8, 2020 (CN) .......................... 202010270140.6

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  CPC ............................. G02B 13/0045; G02B 9/64
  See application file for complete search history.

(56) References Cited

U.S. PATENT DOCUMENTS 10,656,393 B2 5/2020 Yang

FOREIGN PATENT DOCUMENTS

CN 105676422 A 6/2016
CN 109491047 A * 3/2019 ......... G02B 13/0045

OTHER PUBLICATIONS

CN-109491047-A, trnaslation (Year: 2019).*

* cited by examiner

*Primary Examiner* — Wen Huang
(74) *Attorney, Agent, or Firm* — Sughrue Mion, PLLC

(57) ABSTRACT

The present disclosure discloses a camera lens group including, sequentially from an object side to an image side along an optical axis, a stop; a first lens having positive refractive power; a second lens having negative refractive power; a third lens having positive refractive power; a fourth lens having refractive power; a fifth lens having refractive power; a sixth lens having positive refractive power; and a seventh lens having negative refractive power. An aperture number Fno of the camera lens group satisfies: Fno≤1.53. A distance TTL along the optical axis from an object-side surface of the first lens to an imaging plane of the camera lens group and half of a diagonal length ImgH of an effective pixel area on the imaging plane of the camera lens group satisfy: TTL/ImgH≤1.31.

19 Claims, 11 Drawing Sheets

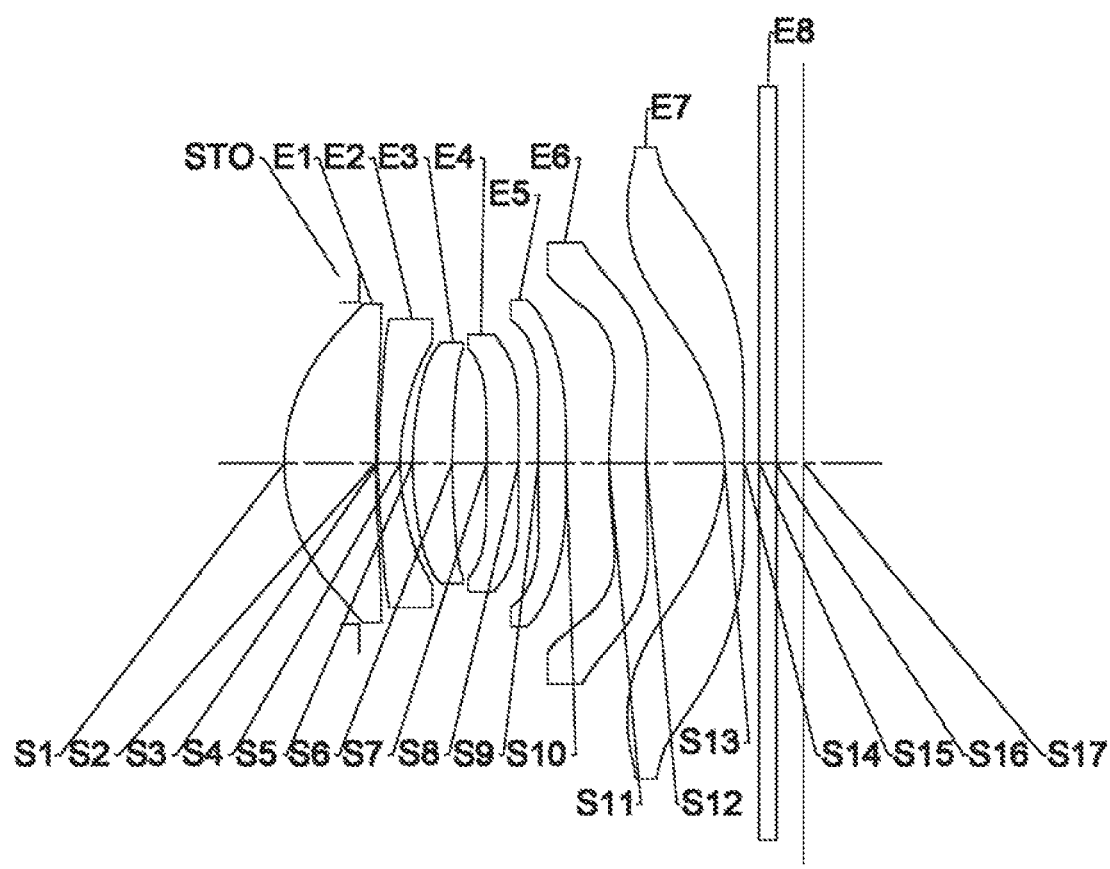
Fig. 5
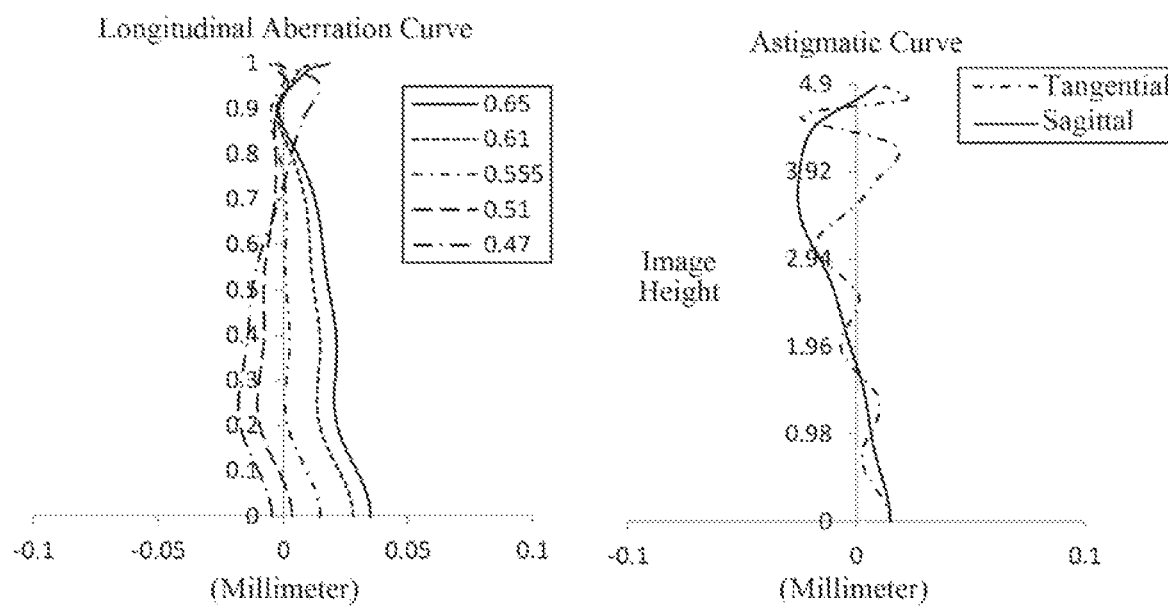
Fig. 6A
Fig. 6B

CAMERA LENS GROUP INCLUDING SEVEN LENSES OF +−+−++−, +−+++++− OR +−++−+− REFRACTIVE POWERS

CROSS-REFERENCE TO RELATED APPLICATION

This application claims benefit of priority to Chinese Patent Application No. 202010270140.6 filed on Apr. 8, 2020 before the China National Intellectual Property Administration, the entire disclosure of which is incorporated herein by reference in its entity.

TECHNICAL FIELD

The present disclosure relates to the field of optical elements, and more specifically, relates to a camera lens group.

BACKGROUND

Portable devices, such as mobile phones, are usually equipped with camera modules to enable the mobile phone to have a camera function. In recent years, with the upgrading of consumer electronic products and the development of image software functions and video software functions on consumer electronic products, the market has increasingly higher requirements for camera modules. The camera module is usually provided with a Charge-coupled Device (CCD) type image sensor or a Complementary Metal-Oxide Semiconductor (CMOS) type image sensor, and provided with a camera lens group. The camera lens group may collect the light on the object side, and the imaging light travels along the optical path of the camera lens group and irradiates the image sensor, and then the image sensor converts the light signal into an electrical signal to form image data.

The rapid development of the lens modules of the mobile phone, especially the popularity of large-sized, high-pixel CMOS chips, has caused the mobile phone manufacturers to place more stringent requirements on the image quality of the camera lens groups. In addition, as the performance of CCD and CMOS elements increases and the size thereof reduces, higher requirements for high image quality and miniaturization are placed on the matched imaging systems.

In order to meet the requirements of miniaturization and imaging needs, a camera lens group that may simultaneously satisfy the characteristics of ultra-thin, large aperture, and large image plane is required.

SUMMARY

The present disclosure provides a camera lens group that is applicable to the portable electronic products and at least solves or partially solves at least one of the above disadvantages of the prior art.

The present disclosure provides a camera lens group which includes, sequentially from an object side to an image side along an optical axis, a stop; a first lens having positive refractive power; a second lens having negative refractive power; a third lens having positive refractive power; a fourth lens having refractive power; a fifth lens having refractive power; a sixth lens having positive refractive power; and a seventh lens having negative refractive power. An aperture number Fno of the camera lens group satisfies: Fno≤1.53. A distance TTL along the optical axis from an object-side surface of the first lens to an imaging plane of the camera lens group and half of a diagonal length ImgH of an effective pixel area on the imaging plane of the camera lens group satisfy: TTL/ImgH≤1.31. An effective focal length f3 of the third lens, a total effective focal length f of the camera lens group and half of the diagonal length ImgH of the effective pixel area on the imaging plane satisfy: 11.50 mm<f3/f*ImgH<14.00 mm.

In one embodiment, at least one of the object-side surface of the first lens to an image-side surface of the seventh lens is aspheric.

In one embodiment, a combined focal length f34 of the third lens and the fourth lens and an optical back focus BFL of the camera lens group may satisfy: 19.00<f34/BFL<33.00.

In one embodiment, a radius of curvature R2 of an image-side surface of the first lens and an effective focal length f1 of the first lens may satisfy: 2.00<R2/f1<3.00.

In one embodiment, a radius of curvature R5 of an object-side surface of the third lens and a radius of curvature R6 of an image-side surface of the third lens may satisfy: 2.00<(R6+R5)/(R6−R5)<3.50.

In one embodiment, a distance TD along the optical axis from the object-side surface of the first lens to an image-side surface of the seventh lens and a sum of spaced intervals ΣAT along the optical axis between each two adjacent lenses of the first lens to the seventh lens may satisfy: ΣAT/TD≤0.42.

In one embodiment, a center thickness CT6 of the sixth lens along the optical axis and a spaced interval T67 between the sixth lens and the seventh lens along the optical axis may satisfy: 2.00<T67/CT6<3.00.

In one embodiment, SAG51, being an on-axis distance from an intersection of an object-side surface of the fifth lens and the optical axis to a vertex of an effective radius of the object-side surface of the fifth lens, and SAG52, being an on-axis distance from an intersection of an image-side surface of the fifth lens and the optical axis to a vertex of an effective radius of the image-side surface of the fifth lens, may satisfy: 4.50<(SAG51+SAG52)/(SAG52−SAG51)<6.50.

In one embodiment, SAG31, being an on-axis distance from an intersection of an object-side surface of the third lens and the optical axis to a vertex of an effective radius of the object-side surface of the third lens, and SAG32, being an on-axis distance from an intersection of an image-side surface of the third lens and the optical axis to a vertex of an effective radius of the image-side surface of the third lens, may satisfy: 2.00<(SAG31+SAG32)/(SAG31−SAG32)<2.50.

In one embodiment, a maximum effective radius DT11 of the object-side surface of the first lens and a maximum effective radius DT62 of an image-side surface of the sixth lens may satisfy: 5.00<(DT11+DT62)/(DT62−DT11)<7.50.

In one embodiment, a maximum effective radius DT71 of an object-side surface of the seventh lens and a maximum effective radius DT72 of an image-side surface of the seventh lens may satisfy: 19.00<(DT71+DT72)/(DT72−DT71)<65.00.

In one embodiment, an edge thickness ET6 of the sixth lens and an edge thickness ET7 of the seventh lens may satisfy: 0.50<ET6/ET7<2.00.

In a second aspect, the present disclosure provides a camera lens group which includes, sequentially from an object side to an image side along an optical axis, a stop; a first lens having positive refractive power; a second lens having negative refractive power; a third lens having positive refractive power; a fourth lens having refractive power;

a fifth lens having refractive power; a sixth lens having positive refractive power; and a seventh lens having negative refractive power. An aperture number Fno of the camera lens group may satisfy: Fno≤1.53. A distance TTL along the optical axis from an object-side surface of the first lens to an imaging plane of the camera lens group and half of a diagonal length ImgH of an effective pixel area on the imaging plane of the camera lens group may satisfy: TTL/ImgH≤1.31. A radius of curvature R5 of an object-side surface of the third lens and a radius of curvature R6 of an image-side surface of the third lens may satisfy: 2.00<(R6+R5)/(R6−R5)<3.50.

The present disclosure discloses a camera lens group with seven lenses. The above camera lens group has at least one beneficial effect such as ultra-thin, large aperture, large imaging plane and the like by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of a camera lens group according to example 3 of the present disclosure; and FIGS. 6A to 6D illustrate a longitudinal aberration curve, an astigmatic curve, a distortion curve, and a lateral color curve of the camera lens group of the example 3, respectively.

DETAILED DESCRIPTION OF EMBODIMENTS

Figure 1:
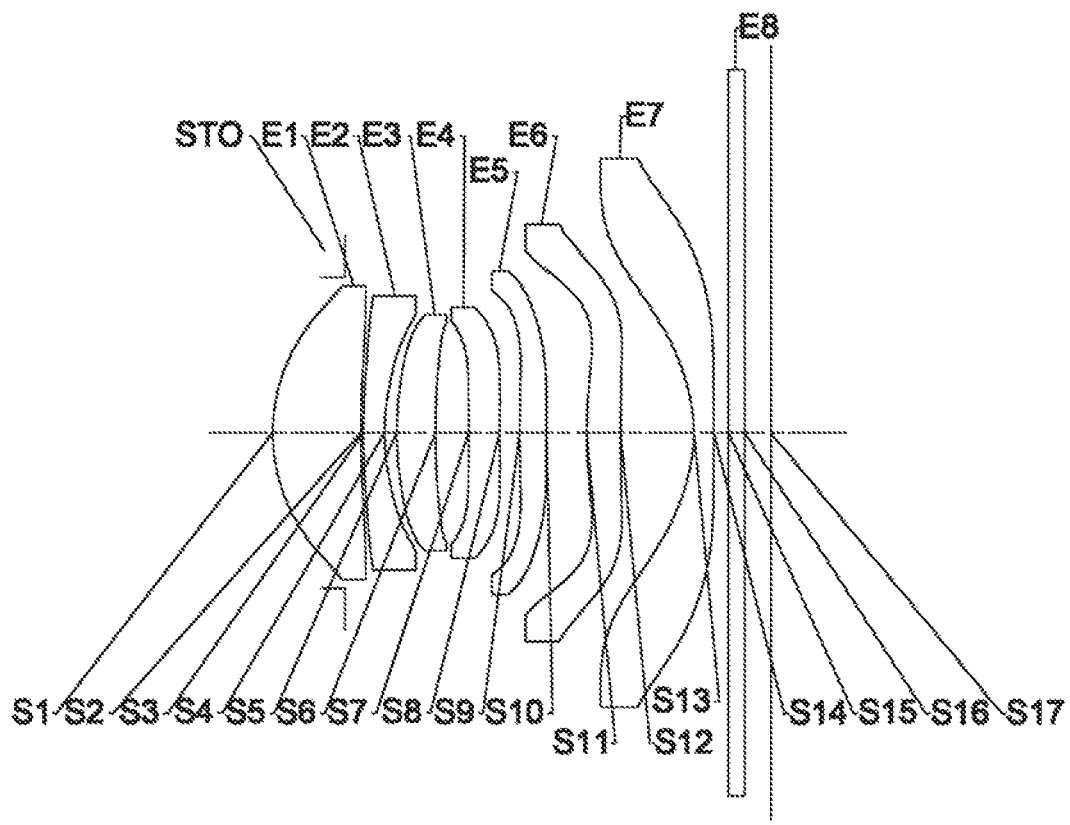
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include, for example, seven lenses having refractive power, that is, a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the above camera lens group may further include at least one stop. The stop may be disposed at an appropriate position as required, for example, between the object side and the first lens. Optionally, the above camera lens group may further include an optical filter for correcting the color deviation and/or a protective glass for protecting the photosensitive element located on an imaging plane.

In an exemplary embodiment, the first lens may have positive refractive power; the second lens may have negative refractive power; the third lens may have positive refractive power; the fourth lens has positive or negative refractive power; the fifth lens has positive or negative refractive power; the sixth lens may have positive refractive power; and the seventh lens may have negative refractive power. The low-order aberrations of the system are effectively compensated by rationally controlling the positive and negative distribution of the refractive power and the surface curvature of each lens in the system.

In an exemplary embodiment, the camera lens group provided by the present disclosure may satisfy: Fno≤1.53, where Fno is an aperture number of the camera lens group. By controlling the aperture numbers of the camera lens group, the camera lens group may have the characteristic of large aperture. As an example, Fno may satisfy: 1.48<Fno≤1.53.

In an exemplary embodiment, the camera lens group provided by the present disclosure may satisfy: TTL/ImgH≤1.31, where TTL is a distance along the optical axis from an object-side surface of the first lens to an imaging plane of the camera lens group, and ImgH is half of a diagonal length of an effective pixel area on the imaging plane of the camera lens group. By controlling the ratio of the total optical length of the camera lens group to the image height of the camera lens group, the size of the camera lens group may be effectively controlled while ensuring a large imaging plane. This not only ensures the ultra-thinness of the camera lens group, but also enables the camera lens group to be compatible with a super-sized photosensitive surface to effectively improve imaging efficiency. More specifically, TTL and ImgH may satisfy: 1.25<TTL/ImgH≤1.31.

In an exemplary embodiment, the camera lens group provided by the present disclosure may satisfy: 11.50 mm<f3/f*ImgH<14.00 mm, where f3 is an effective focal length of the third lens, f is a total effective focal length of the camera lens group, and ImgH is half of a diagonal length of an effective pixel area on an imaging plane. By controlling the conditional expression, it is beneficial to achieve a super-sized photosensitive surface and effectively improve imaging efficiency. More specifically, f, f3 and ImgH may satisfy: 11.90 mm<f3/f*ImgH<13.70 mm.

In an exemplary embodiment, the camera lens group provided by the present disclosure may satisfy: 19.00<f34/BFL<33.00, where f34 is a combined focal length of the third lens and the fourth lens, and BFL is an optical back focus of the camera lens group. In other words, BFL is a distance along the optical axis from the image-side surface of the seventh lens to an imaging plane of the camera lens group. By controlling the ratio of the combined focal length of the third lens and the fourth lens to the optical back focus in this range, it is possible to ensure that the optical back focus of the camera lens group is large enough, which in turn facilitates the automatic focusing of the camera lens group. More specifically, f34 and BFL may satisfy: 19.50<f34/BFL<32.90.

In an exemplary embodiment, the camera lens group provided by the present disclosure may satisfy: 2.00<R2/f1<3.00, where R2 is a radius of curvature of an image-side surface of the first lens, and f1 is an effective focal length of the first lens. By controlling the ratio of the radius of curvature of the image-side surface of the first lens to the effective focal length of the first lens, the curvature of the image-side surface of the first lens may be controlled, thereby facilitating the molding and demolding of the first lens. More specifically, R2 and f1 may satisfy: 2.10<R2/f1<2.70.

In an exemplary embodiment, the camera lens group provided by the present disclosure may satisfy: 2.00<(R6+R5)/(R6−R5)<3.50, where R5 is a radius of curvature of an object-side surface of the third lens, and R6 is a radius of curvature of an image-side surface of the third lens. By controlling the ratio of the curvature radii of the two surfaces of the third lens within this range, the refractive power of the third lens of the camera lens group may be constrained, thereby effectively improving the aberration correction capability of the camera lens group. More specifically, R5 and R6 may satisfy: 2.60<(R6+R5)/(R6−R5)<3.10.

In an exemplary embodiment, the camera lens group provided by the present disclosure may satisfy: ΣAT/TD≤0.42, where TD is a distance along the optical axis from an object-side surface of the first lens to an image-side surface of the seventh lens, and ΣAT is a sum of spaced intervals along the optical axis between each two adjacent lenses of the first lens to the seventh lens. By controlling the conditional expression, the interval between the lenses may be reasonably controlled, so as to avoid excessive deflection of the imaging light of the camera lens group, and reduce the processing difficulty of the camera lens group. ΣAT may satisfy ΣAT=T12+T23+T34+T45+T56+T67. More specifically, ΣAT and TD may satisfy: 0.4<ΣAT/TD≤0.42.

In an exemplary embodiment, the camera lens group provided by the present disclosure may satisfy: 2.00<T67/CT6<3.00, where CT6 is a center thickness of the sixth lens along the optical axis, and T67 is a spaced interval between the sixth lens and the seventh lens along the optical axis. By controlling the ratio of the air interval between the sixth lens and the seventh lens along the optical axis to the center thickness of the sixth lens along the optical axis, the field curvature of the camera lens group may be effectively controlled, so that the camera lens group has a reasonable field curvature. More specifically, T67 and CT6 may satisfy: 2.00<T67/CT6<2.80.

In an exemplary embodiment, the camera lens group provided by the present disclosure may satisfy: 4.50<(SAG51+SAG52)/(SAG52−SAG51)<6.50, where SAG51 is an on-axis distance from an intersection of an object-side surface of the fifth lens and the optical axis to a vertex of an effective radius of the object-side surface of the fifth lens, and SAG52 is an on-axis distance from an intersection of an image-side surface of the fifth lens and the optical axis to a vertex of an effective radius of the image-side surface of the fifth lens. By controlling the ratio of the sagittal heights of the two surfaces of the fifth lens, it is beneficial to ensure that the fifth lens is better processed and molded, thereby obtaining a good imaging effect. More specifically, SAG51 and SAG52 may satisfy: 4.90<(SAG51+SAG52)/(SAG52−SAG51)<6.20.

In an exemplary embodiment, the camera lens group provided by the present disclosure may satisfy: 2.00<(SAG31+SAG32)/(SAG31−SAG32)<2.50, where SAG31 is an on-axis distance from an intersection of an object-side surface of the third lens and the optical axis to a vertex of an effective radius of the object-side surface of the third lens, and SAG32 is an on-axis distance from an intersection of an image-side surface of the third lens and the optical axis to a vertex of an effective radius of the image-side surface of the third lens. By controlling the ratio of the sagittal heights of the two surfaces of the third lens, it is beneficial to ensure that the third lens is better processed and molded, and thus a good imaging effect is obtained.

In an exemplary embodiment, the camera lens group provided by the present disclosure may satisfy: 5.00<(DT11+DT62)/(DT62−DT11)<7.50, where DT11 is a maximum effective radius of an object-side surface of the first lens, and DT62 is a maximum effective radius of an image-side surface of the sixth lens. On the one hand, by reasonably controlling the maximum effective radius of the first lens and the maximum effective radius of the sixth lens, it is beneficial to reduce the sizes of the object-side end and the image-side end of the camera lens group and reduce the aperture difference. On the other hand, it is beneficial to reasonably limit the range of incident light to eliminate poor-quality light at the edge, thereby reducing off-axis aberrations, and effectively improving the resolution of the camera lens group.

In an exemplary embodiment, the camera lens group provided by the present disclosure may satisfy: 19.00<(DT71+DT72)/(DT72−DT71)<65.00, where DT71 is a maximum effective radius of an object-side surface of the seventh lens, and DT72 is a maximum effective radius of an image-side surface of the seventh lens. By reasonably configuring the maximum effective radii of the two surfaces of the seventh lens, it is possible to effectively prevent the difference between the effective radius of the object-side surface and the effective radius of the image-side surface of the seventh lens from being too large, so as to facilitate the processing and molding of the seventh lens, thereby improving the stability of the performance of the camera lens group. More specifically, DT71 and DT72 may satisfy: 19.50<(DT71+DT72)/(DT72−DT71)<64.20.

In an exemplary embodiment, the camera lens group provided by the present disclosure may satisfy: 0.50<ET6/ET7<2.00, where ET6 is an edge thickness of the sixth lens, and ET7 is an edge thickness of the seventh lens. By controlling the ratio of the edge thickness of the sixth lens to the edge thickness of the seventh lens, the sixth lens and the seventh lens may be better shaped and processed. More specifically, ET6 and ET7 may satisfy: 0.80<ET6/ET7<1.60.

The camera lens group according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the camera lens group is more advantageous for production processing and may be applied to portable electronic products. At the same time, the camera lens group of the present disclosure also has excellent optical performance such as large aperture, high luminous flux, large imaging plane, and high imaging efficiency.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking seven lenses as an example, the camera lens group is not limited to include seven lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is convex. The optical filter E8 has an object-side surface S15 and an image-side surface S16. The camera lens group has an imaging plane S17, and light from an object sequentially passes through the respective surfaces S1 to S16 and is finally imaged on the imaging plane S17.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9167 | | | | |
| S1 | Aspheric | 2.2527 | 1.1149 | 1.55 | 56.1 | 4.93 | −0.1082 |
| S2 | Aspheric | 11.4218 | 0.0300 | | | | −23.8541 |
| S3 | Aspheric | 7.5170 | 0.2700 | 1.62 | 23.5 | −7.87 | 0.3053 |
| S4 | Aspheric | 2.9855 | 0.1530 | | | | −0.0458 |
| S5 | Aspheric | 4.3298 | 0.4919 | 1.55 | 56.1 | 14.33 | 2.7755 |
| S6 | Aspheric | 9.3086 | 0.4196 | | | | 31.7443 |
| S7 | Aspheric | 30.3517 | 0.3925 | 1.62 | 23.5 | −66.80 | −1.8935 |
| S8 | Aspheric | 17.7124 | 0.2532 | | | | −76.1476 |
| S9 | Aspheric | 9.7745 | 0.3410 | 1.55 | 56.1 | 22.65 | −99.0000 |
| S10 | Aspheric | 46.0477 | 0.5043 | | | | −99.0000 |
| S11 | Aspheric | 5.9672 | 0.4328 | 1.62 | 23.5 | 8.85 | −2.1354 |
| S12 | Aspheric | −125.0948 | 0.9269 | | | | −99.0000 |
| S13 | Aspheric | −1.9252 | 0.2500 | 1.55 | 56.1 | −3.54 | −1.3179 |
| S14 | Aspheric | −423.2225 | 0.1819 | | | | −99.0000 |
| S15 | Spherical | Infinite | 0.2100 | 1.52 | 64.2 | | |
| S16 | Spherical | Infinite | 0.3281 | | | | |
| S17 | Spherical | Infinite | | | | | |

In example 1, a total effective focal length f of the camera lens group is 5.50 mm, a distance TTL along the optical axis from the object-side surface S1 of the first lens E1 to the imaging plane S17 is 6.30 mm, half of a diagonal length ImgH of an effective pixel area on the imaging plane S17 is 4.85 mm, and half of a maximum field-of-view Semi-FOV is 40.8°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2 h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 |
|---|---|---|---|---|---|
| S1 | 2.8088E−03 | −1.0506E−02 | 2.1068E−02 | −2.4489E−02 | 1.7297E−02 |
| S2 | 1.0486E−02 | −3.2482E−02 | 3.4097E−02 | −2.4599E−02 | 1.3077E−02 |
| S3 | −9.4233E−03 | −2.6216E−02 | 4.0291E−02 | −3.7380E−02 | 2.5015E−02 |
| S4 | −1.8286E−02 | 2.4811E−03 | 2.3335E−02 | −4.9578E−02 | 6.0594E−02 |
| S5 | −3.0070E−03 | −3.0183E−02 | 9.3763E−02 | −1.5323E−01 | 1.5806E−01 |
| S6 | −8.5706E−03 | −2.2530E−02 | 1.0836E−01 | −2.6019E−01 | 3.6388E−01 |
| S7 | −5.1697E−02 | 4.9737E−02 | −1.6952E−01 | 3.2802E−01 | −4.0543E−01 |
| S8 | −4.5743E−02 | −1.3250E−02 | 6.0852E−02 | −1.1464E−01 | 1.1435E−01 |
| S9 | −3.5213E−02 | −1.3714E−02 | 4.7509E−02 | −4.8388E−02 | 2.7017E−02 |
| S10 | −5.7845E−02 | 1.9312E−02 | −3.2574E−02 | 5.9365E−02 | −5.2599E−02 |
| S11 | 1.6805E−02 | −5.4852E−02 | 3.2212E−02 | −1.7747E−02 | 8.1406E−03 |
| S12 | 5.8200E−02 | −5.0745E−02 | 1.3827E−02 | −1.1057E−03 | −4.3071E−04 |
| S13 | 6.2030E−02 | −4.5249E−02 | 1.5648E−02 | −2.9409E−03 | 3.3663E−04 |
| S14 | 2.4699E−03 | −9.6047E−03 | 2.9826E−03 | 4.7196E−04 | 4.2728E−05 |

| Surface number | A14 | A16 | A18 | A20 |
|---|---|---|---|---|
| S1 | −7.5984E−03 | 2.0251E−03 | −3.0040E−04 | 1.8910E−05 |
| S2 | −4.8910E−03 | 1.1793E−03 | −1.6309E−04 | 9.8824E−06 |
| S3 | −1.1279E−02 | 3.1630E−03 | −4.9422E−04 | 3.2893E−05 |
| S4 | −4.5517E−02 | 2.0895E−02 | −5.3040E−03 | 5.5907E−04 |
| S5 | −1.0432E−01 | 4.3394E−02 | −1.0268E−02 | 1.0456E−03 |
| S6 | −3.0585E−01 | 1.5242E−01 | −4.1416E−02 | 4.7399E−03 |
| S7 | 3.1068E−01 | −1.4344E−01 | 3.6598E−02 | −3.9737E−03 |
| S8 | −7.0762E−02 | 2.7176E−02 | −5.8852E−03 | 5.4619E−04 |

TABLE 2-continued

| | | | | |
|---|---|---|---|---|
| S9 | −1.2070E−02 | 4.4534E−03 | −1.0022E−03 | 9.2180E−05 |
| S10 | 2.4761E−02 | −6.4175E−03 | 8.6635E−04 | −4.7684E−05 |
| S11 | −2.6300E−03 | 5.2005E−04 | −5.4865E−05 | 2.3495E−06 |
| S12 | 1.3856E−04 | −1.5623E−05 | 6.5386E−07 | −2.0569E−09 |
| S13 | −2.4325E−05 | 1.0890E−06 | −2.7650E−08 | 3.0464E−10 |
| S14 | −2.2578E−06 | 6.8292E−08 | −1.0726E−09 | 6.0314E−12 |

Figures 2A, 2B:
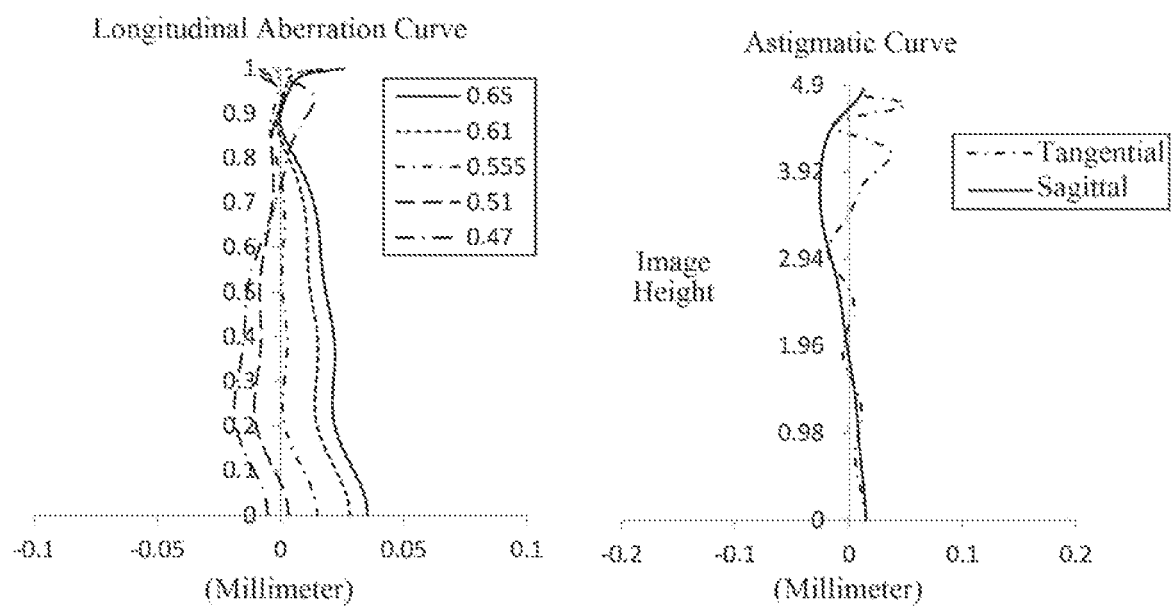
FIGS. 2A to 2D illustrate a longitudinal aberration curve, an astigmatic curve, a distortion curve, and a lateral color curve of the camera lens group of the example 1, respectively.
Figures 2C, 2D:
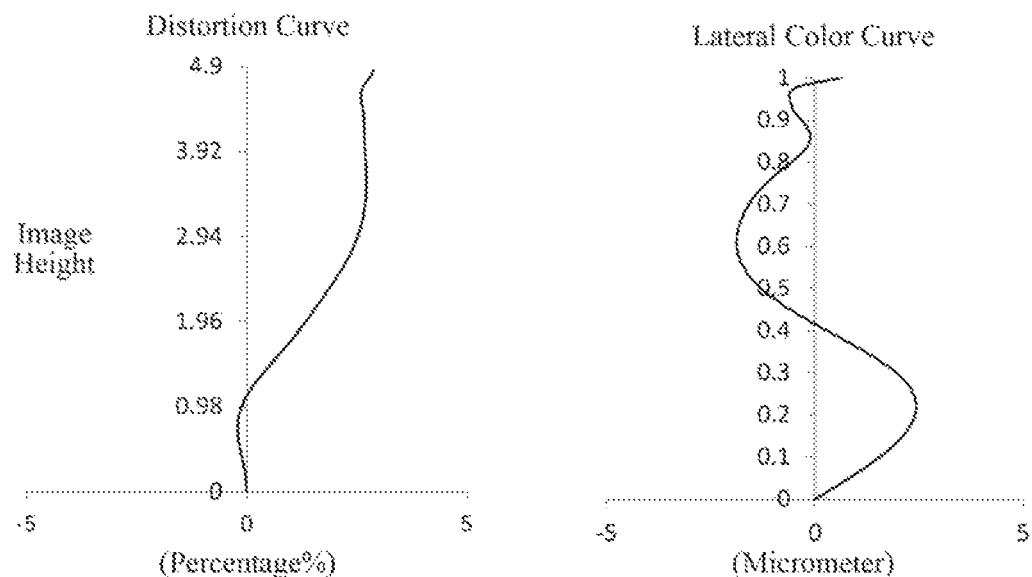

FIG. 2A illustrates a longitudinal aberration curve of the camera lens group according to example 1, representing deviations of focal points converged by light of different wavelengths after passing through the system. FIG. 2B illustrates an astigmatic curve of the camera lens group according to example 1, representing a curvature of a tangential plane and a curvature of a sagittal plane. FIG. 2C illustrates a distortion curve of the camera lens group according to example 1, representing amounts of distortion corresponding to different image heights. FIG. 2D illustrates a lateral color curve of the camera lens group according to example 1, representing deviations of different image heights on an imaging plane after light passes through the system. It can be seen from FIG. 2A to FIG. 2D that the camera lens group provided in example 1 may achieve good image quality.

Example 2

Figure 3:
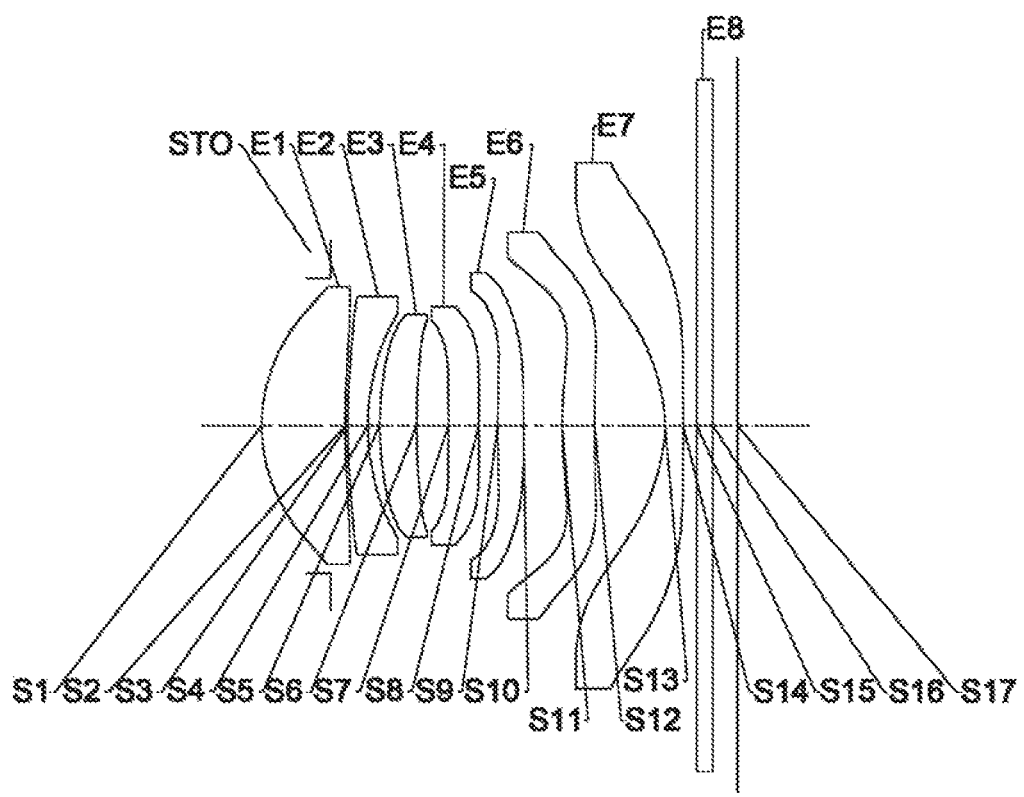
FIG. 3 illustrates a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is concave. The optical filter E8 has an object-side surface S15 and an image-side surface S16. The camera lens group has an imaging plane S17, and light from an object sequentially passes through the respective surfaces S1 to S16 and is finally imaged on the imaging plane S17.

In example 2, a total effective focal length f of the camera lens group is 5.51 mm, a distance TTL along the optical axis from the object-side surface S1 of the first lens E1 to the imaging plane S17 is 6.31 mm, half of a diagonal length ImgH of an effective pixel area on the imaging plane S17 is 4.86 mm, and half of a maximum field-of-view Semi-FOV is 40.8°.

Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.9167 | | | | |
| S1 | Aspheric | 2.2524 | 1.1075 | 1.55 | 56.1 | 4.91 | −0.1090 |
| S2 | Aspheric | 11.6200 | 0.0300 | | | | −23.2534 |
| S3 | Aspheric | 7.4466 | 0.2700 | 1.62 | 23.5 | −7.81 | 0.2977 |
| S4 | Aspheric | 2.9608 | 0.1560 | | | | −0.0541 |
| S5 | Aspheric | 4.3257 | 0.4914 | 1.55 | 56.1 | 14.29 | 2.8230 |
| S6 | Aspheric | 9.3221 | 0.4241 | | | | 31.7051 |
| S7 | Aspheric | 36.2537 | 0.4011 | 1.62 | 23.5 | −59.12 | 10.7443 |
| S8 | Aspheric | 18.4976 | 0.2497 | | | | −77.0598 |
| S9 | Aspheric | 9.7135 | 0.3431 | 1.55 | 56.1 | 21.61 | −99.0000 |
| S10 | Aspheric | 54.3295 | 0.5115 | | | | −92.1780 |
| S11 | Aspheric | 6.0614 | 0.4317 | 1.62 | 23.5 | 8.94 | −2.0762 |
| S12 | Aspheric | −112.5147 | 0.9337 | | | | −99.0000 |
| S13 | Aspheric | −1.9341 | 0.2400 | 1.55 | 56.1 | −3.54 | −1.3139 |
| S14 | Aspheric | 1000.6114 | 0.1820 | | | | 99.0000 |
| S15 | Spherical | Infinite | 0.2100 | 1.52 | 64.2 | | |
| S16 | Spherical | Infinite | 0.3282 | | | | |
| S17 | Spherical | Infinite | | | | | |

TABLE 4

| Surface number | A4 | A6 | A8 | A10 | A12 |
|---|---|---|---|---|---|
| S1 | 2.9300E−03 | −1.0612E−02 | 2.1379E−02 | −2.5012E−02 | 1.7803E−02 |
| S2 | 1.0965E−02 | −3.4320E−02 | 3.7193E−02 | −2.7278E−02 | 1.4431E−02 |
| S3 | −9.4408E−03 | −2.7430E−02 | 4.1979E−02 | −3.8053E−02 | 2.4725E−02 |
| S4 | −1.8504E−02 | 2.6834E−03 | 2.2909E−02 | −4.9490E−02 | 6.1623E−02 |
| S5 | −3.0039E−03 | −2.8220E−02 | 8.8400E−02 | −1.4504E−01 | 1.5021E−01 |
| S6 | −8.7923E−03 | −1.9430E−02 | 9.6567E−02 | −2.3548E−01 | 3.3312E−01 |
| S7 | −5.0798E−02 | 4.7085E−02 | −1.6554E−01 | 3.2514E−01 | −4.0549E−01 |
| S8 | −4.5499E−02 | −1.2678E−02 | 5.4790E−02 | −1.0181E−01 | 1.0064E−01 |
| S9 | −3.3874E−02 | −1.3337E−02 | 4.1779E−02 | −4.0152E−02 | 2.0690E−02 |
| S10 | −5.5465E−02 | 1.7615E−02 | −3.1785E−02 | 5.7939E−02 | −5.1034E−02 |
| S11 | 1.6284E−02 | −5.1844E−02 | 2.8861E−02 | −1.5525E−02 | 7.1343E−03 |
| S12 | 5.6808E−02 | −4.7964E−02 | 1.1658E−02 | −1.4303E−04 | −6.9963E−04 |
| S13 | 6.1953E−02 | −4.5195E−02 | 1.5618E−02 | −2.9343E−03 | 3.3591E−04 |
| S14 | 2.6397E−03 | −9.9969E−03 | 3.1726E−03 | −5.1836E−04 | 4.9432E−05 |

| Surface number | A14 | A16 | A18 | A20 |
|---|---|---|---|---|
| S1 | −7.8845E−03 | 2.1188E−03 | −3.1692E−04 | 2.0117E−05 |
| S2 | −5.3110E−03 | 1.2582E−03 | −1.7137E−04 | 1.0265E−05 |
| S3 | −1.0894E−02 | 3.0094E−03 | −4.6592E−04 | 3.0855E−05 |
| S4 | −4.6912E−02 | 2.1694E−02 | −5.5284E−03 | 5.8440E−04 |
| S5 | −9.9439E−02 | 4.1493E−02 | −9.8553E−03 | 1.0085E−03 |
| S6 | −2.8268E−01 | 1.4207E−01 | −3.8900E−02 | 4.4834E−03 |
| S7 | 3.1271E−01 | −1.4517E−01 | 3.7236E−02 | −4.0650E−03 |
| S8 | −6.2081E−02 | 2.3881E−02 | −5.1931E−03 | 4.8431E−04 |
| S9 | −8.9876E−03 | 3.5099E−03 | −8.3904E−04 | 8.0213E−05 |
| S10 | 2.3937E−02 | −6.1904E−03 | 8.3437E−04 | −4.5861E−05 |
| S11 | −2.3172E−03 | 4.5866E−04 | −4.8228E−05 | 2.0523E−06 |
| S12 | 1.8801E−04 | −2.1514E−05 | 1.0654E−06 | −1.4727E−08 |
| S13 | −2.4285E−05 | 1.0881E−06 | −2.7663E−08 | 3.0535E−10 |
| S14 | −2.8514E−06 | 9.9882E−08 | −2.0035E−09 | 1.7773E−11 |

Figure 4A:
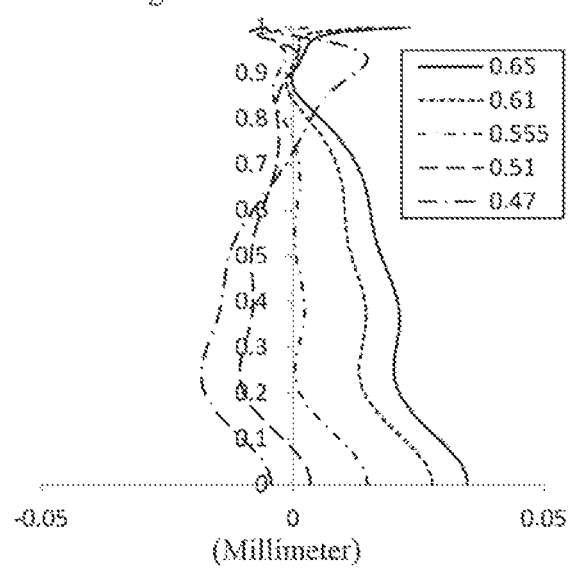
FIGS. 4A to 4D illustrate a longitudinal aberration curve, an astigmatic curve, a distortion curve, and a lateral color curve of the camera lens group of the example 2, respectively.
Figure 4B:
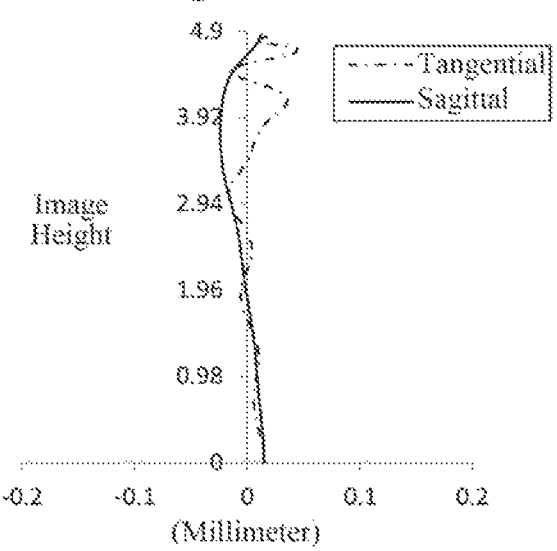
Figure 4C:
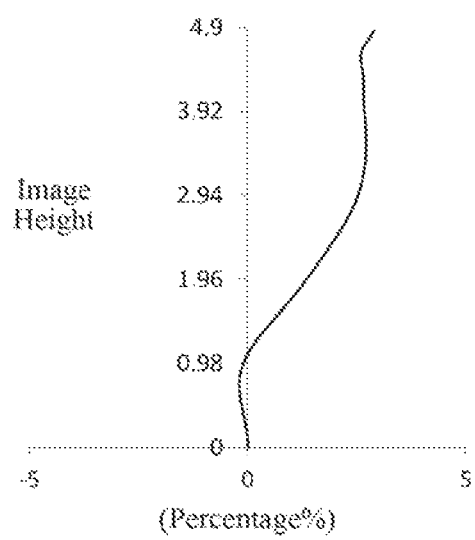
Figure 4D:
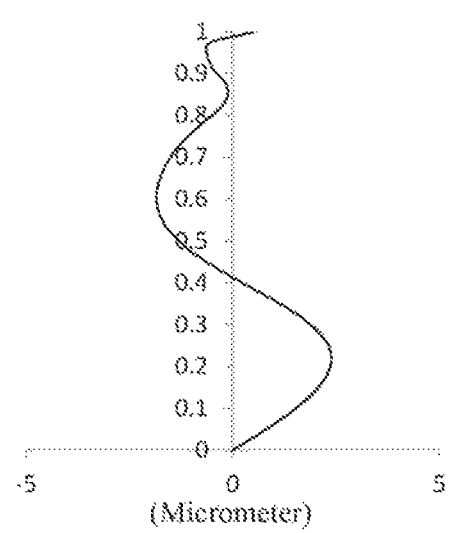

FIG. 4A illustrates a longitudinal aberration curve of the camera lens group according to example 2, representing deviations of focal points converged by light of different wavelengths after passing through the system. FIG. 4B illustrates an astigmatic curve of the camera lens group according to example 2, representing a curvature of a tangential plane and a curvature of a sagittal plane. FIG. 4C illustrates a distortion curve of the camera lens group according to example 2, representing amounts of distortion corresponding to different image heights. FIG. 4D illustrates a lateral color curve of the camera lens group according to example 2, representing deviations of different image heights on an imaging plane after light passes through the system. It can be seen from FIG. 4A to FIG. 4D that the camera lens group provided in example 2 may achieve good image quality.

Example 3

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is convex. The optical filter E8 has an object-side surface S15 and an image-side surface S16. The camera lens group has an imaging plane S17, and light from an object sequentially passes through the respective surfaces S1 to S16 and is finally imaged on the imaging plane S17.

In example 3, a total effective focal length f of the camera lens group is 5.52 mm, a distance TTL along the optical axis from the object-side surface S1 of the first lens E1 to the imaging plane S17 is 6.32 mm, half of a diagonal length ImgH of an effective pixel area on the imaging plane S17 is 4.87 mm, and half of a maximum field-of-view Semi-FOV is 40.8°.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9167 | | | | |
| S1 | Aspheric | 2.2560 | 1.1139 | 1.55 | 56.1 | 4.95 | −0.1065 |
| S2 | Aspheric | 11.2577 | 0.0300 | | | | −24.6076 |
| S3 | Aspheric | 7.4927 | 0.2700 | 1.62 | 23.5 | −7.85 | 0.5374 |
| S4 | Aspheric | 2.9785 | 0.1498 | | | | −0.0110 |
| S5 | Aspheric | 4.2804 | 0.4831 | 1.55 | 56.1 | 14.13 | 2.6831 |
| S6 | Aspheric | 9.2348 | 0.4203 | | | | 30.6588 |
| S7 | Aspheric | 39.9534 | 0.3866 | 1.62 | 23.5 | −61.29 | −93.6303 |
| S8 | Aspheric | 19.7884 | 0.2400 | | | | −79.6319 |
| S9 | Aspheric | 12.1905 | 0.3407 | 1.55 | 56.1 | 21.76 | −99.0000 |
| S10 | Aspheric | −464.5235 | 0.5190 | | | | −99.0000 |
| S11 | Aspheric | 5.8932 | 0.4553 | 1.62 | 23.5 | 9.20 | −1.9923 |
| S12 | Aspheric | 1000.0000 | 0.9513 | | | | 99.0000 |
| S13 | Aspheric | −1.9373 | 0.2400 | 1.55 | 56.1 | −3.58 | −1.3247 |
| S14 | Aspheric | −222.4504 | 0.1828 | | | | −99.0000 |
| S15 | Spherical | Infinite | 0.2100 | 1.52 | 64.2 | | |
| S16 | Spherical | Infinite | 0.3272 | | | | |
| S17 | Spherical | Infinite | | | | | |

TABLE 6

| Surface number | A4 | A6 | A8 | A10 | A12 |
|---|---|---|---|---|---|
| S1 | 2.8194E−03 | −1.0502E−02 | 2.0944E−02 | −2.4196E−02 | 1.7015E−02 |
| S2 | 6.8635E−03 | −2.2640E−02 | 2.4296E−02 | −2.1990E−02 | 1.5504E−02 |
| S3 | −1.3814E−02 | −1.0846E−02 | 1.9805E−02 | −2.3948E−02 | 2.0982E−02 |
| S4 | −1.8848E−02 | 5.2760E−03 | 2.4194E−02 | −6.0841E−02 | 7.8125E−02 |
| S5 | −3.3583E−03 | −3.0657E−02 | 9.5772E−02 | −1.5793E−01 | 1.6440E−01 |
| S6 | −8.9535E−03 | −1.9040E−02 | 9.1659E−02 | −2.2395E−01 | 3.1810E−01 |
| S7 | −5.0927E−02 | 4.1297E−02 | −1.3475E−01 | 2.5157E−01 | −3.0953E−01 |
| S8 | −4.6034E−02 | −1.1201E−02 | 5.7732E−02 | −1.1264E−01 | 1.1368E−01 |
| S9 | −3.8781E−02 | −1.3542E−02 | 5.7025E−02 | −6.6611E−02 | 4.3215E−02 |
| S10 | −5.7892E−02 | 2.4745E−02 | −3.9761E−02 | 6.3895E−02 | −5.4630E−02 |
| S11 | 9.0193E−03 | −4.1347E−02 | 2.0777E−02 | −1.0449E−02 | 4.5489E−03 |
| S12 | 4.9829E−02 | −4.0551E−02 | 8.5736E−03 | 5.6932E−04 | −8.4726E−04 |
| S13 | 5.8237E−02 | −4.1191E−02 | 1.3912E−02 | −2.5498E−03 | 2.8424E−04 |
| S14 | 1.1377E−03 | −7.5628E−03 | 1.8006E−03 | −1.1961E−04 | −1.6521E−05 |

| Surface number | A14 | A16 | A18 | A20 |
|---|---|---|---|---|
| S1 | −7.4507E−03 | 1.9804E−03 | −2.9307E−04 | 1.8411E−05 |
| S2 | −7.2270E−03 | 2.0309E−03 | −3.1216E−04 | 2.0269E−05 |
| S3 | −1.1292E−02 | 3.5316E−03 | −5.9265E−04 | 4.1501E−05 |
| S4 | −5.9291E−02 | 2.7106E−02 | −6.8371E−03 | 7.1890E−04 |
| S5 | −1.0987E−01 | 4.6425E−02 | −1.1168E−02 | 1.1551E−03 |
| S6 | −2.7080E−01 | 1.3638E−01 | −3.7373E−02 | 4.3075E−03 |
| S7 | 2.3909E−01 | −1.1202E−01 | 2.9146E−02 | −3.2414E−03 |
| S8 | −7.0674E−02 | 2.7207E−02 | −5.9012E−03 | 5.4811E−04 |
| S9 | −2.0237E−02 | 6.8888E−03 | −1.4072E−03 | 1.2120E−04 |
| S10 | 2.5573E−02 | −6.6651E−03 | 9.0914E−04 | −5.0661E−05 |
| S11 | −1.4317E−03 | 2.7792E−04 | −2.8536E−05 | 1.1737E−06 |
| S12 | 2.2650E−04 | −2.8949E−05 | 1.8006E−06 | −4.2736E−08 |
| S13 | −1.9979E−05 | 8.6881E−07 | −2.1396E−08 | 2.2816E−10 |
| S14 | 3.6009E−06 | −2.6995E−07 | 9.4833E−09 | −1.3160E−10 |

Figures 6C, 6D:
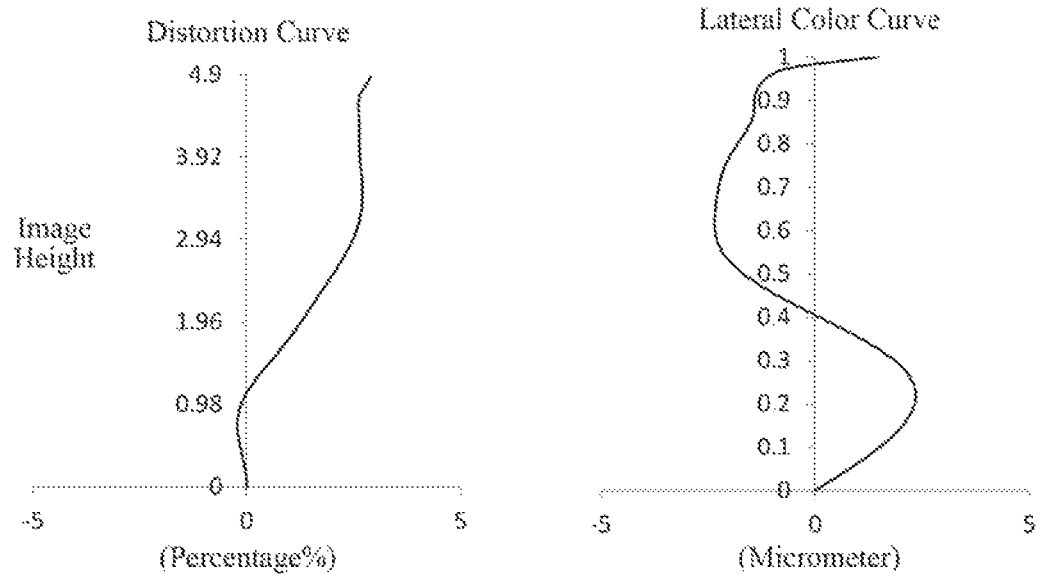

FIG. 6A illustrates a longitudinal aberration curve of the camera lens group according to example 3, representing deviations of focal points converged by light of different wavelengths after passing through the system. FIG. 6B illustrates an astigmatic curve of the camera lens group according to example 3, representing a curvature of a tangential plane and a curvature of a sagittal plane. FIG. 6C illustrates a distortion curve of the camera lens group according to example 3, representing amounts of distortion corresponding to different image heights. FIG. 6D illustrates a lateral color curve of the camera lens group according to example 3, representing deviations of different image heights on an imaging plane after light passes through the system. It can be seen from FIG. 6A to FIG. 6D that the camera lens group provided in example 3 may achieve good image quality.

Example 4

Figure 7:
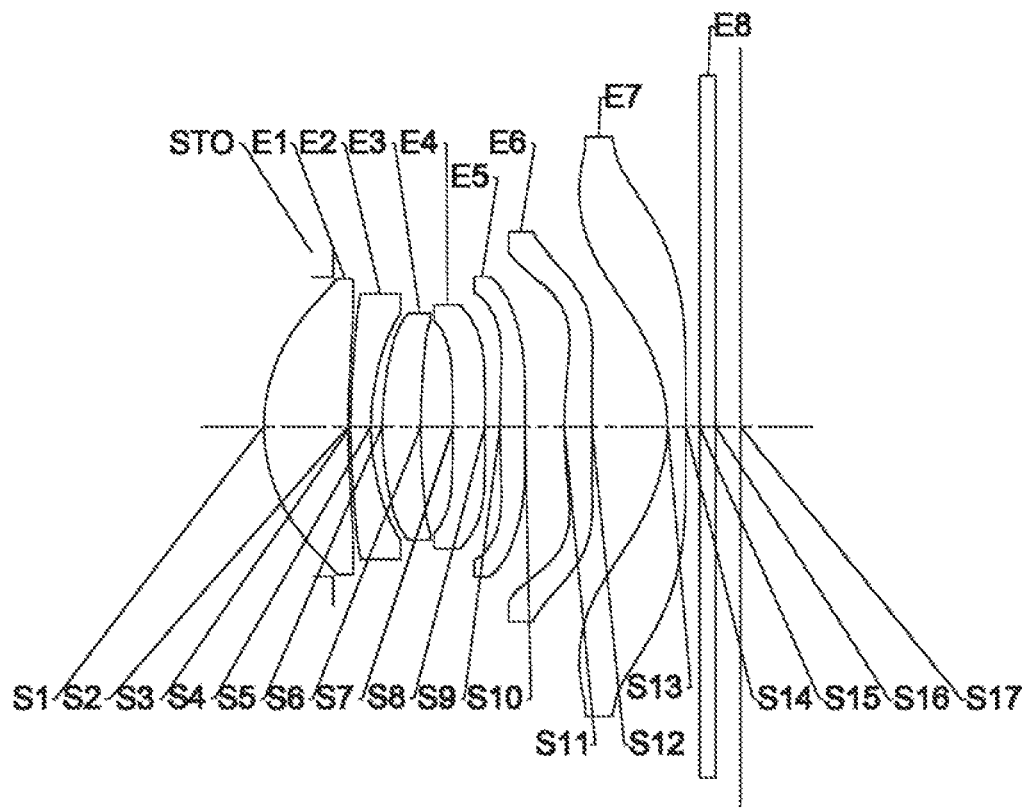
FIG. 7 illustrates a schematic structural view of a camera lens group according to example 4 of the present disclosure.

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is concave, and an image-side surface S8 thereof is concave. The fifth lens E5 has positive refractive power, an object-side surface S9 thereof is convex, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is convex. The optical filter E8 has an object-side surface S15 and an image-side surface S16. The camera lens group has an imaging plane S17, and light from an object sequentially passes through the respective surfaces S1 to S16 and is finally imaged on the imaging plane S17.

In example 4, a total effective focal length f of the camera lens group is 5.49 mm, a distance TTL along the optical axis from the object-side surface S1 of the first lens E1 to the imaging plane S17 is 6.29 mm, half of a diagonal length ImgH of an effective pixel area on the imaging plane S17 is 4.83 mm, and half of a maximum field-of-view Semi-FOV is 40.7°.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.9167 | | | | |
| S1 | Aspheric | 2.2362 | 1.1130 | 1.55 | 56.1 | 4.95 | −0.1090 |
| S2 | Aspheric | 10.6431 | 0.0300 | | | | −23.5880 |
| S3 | Aspheric | 7.2769 | 0.2700 | 1.62 | 23.5 | −7.87 | 0.0153 |
| S4 | Aspheric | 2.9453 | 0.1509 | | | | −0.2291 |
| S5 | Aspheric | 4.1975 | 0.5087 | 1.55 | 56.1 | 13.56 | 2.0358 |
| S6 | Aspheric | 9.2793 | 0.4253 | | | | 31.0405 |
| S7 | Aspheric | −1000.0000 | 0.4192 | 1.62 | 23.5 | −28.88 | −99.0000 |
| S8 | Aspheric | 18.9734 | 0.1992 | | | | −99.0000 |
| S9 | Aspheric | 7.3378 | 0.3310 | 1.55 | 56.1 | 18.18 | −83.2646 |
| S10 | Aspheric | 27.7096 | 0.5192 | | | | −99.0000 |
| S11 | Aspheric | 6.2747 | 0.3645 | 1.62 | 23.5 | 8.21 | −0.6860 |
| S12 | Aspheric | −33.1095 | 0.9990 | | | | −99.0000 |
| S13 | Aspheric | −1.9249 | 0.2400 | 1.55 | 56.1 | −3.53 | −1.3290 |
| S14 | Aspheric | −1646.0093 | 0.1837 | | | | −99.0000 |
| S15 | Spherical | Infinite | 0.2100 | 1.52 | 64.2 | | |
| S16 | Spherical | Infinite | 0.3263 | | | | |
| S17 | Spherical | Infinite | | | | | |

TABLE 8

| Surface number | A4 | A6 | A8 | A10 | A12 |
|---|---|---|---|---|---|
| S1 | 1.7484E−03 | −6.1702E−03 | 1.3186E−02 | −1.6161E−02 | 1.2006E−02 |
| S2 | 1.6662E−03 | 5.2175E−03 | −2.9608E−02 | 3.6325E−02 | −2.3609E−02 |
| S3 | −2.1374E−02 | 1.5645E−02 | −2.6374E−02 | 2.3152E−02 | −9.4190E−03 |
| S4 | −2.6222E−02 | 1.9076E−02 | 7.2810E−03 | −5.7699E−02 | 9.3808E−02 |
| S5 | −5.2862E−03 | −3.4721E−02 | 1.1938E−01 | −2.1226E−01 | 2.2946E−01 |
| S6 | −8.2945E−03 | −1.5341E−02 | 6.9312E−02 | −1.6603E−01 | 2.3397E−01 |
| S7 | −4.7038E−02 | 4.5491E−02 | −1.9381E−01 | 4.2045E−01 | −5.5446E−01 |
| S8 | −4.5279E−02 | −2.2897E−02 | 7.0761E−02 | −1.0972E−01 | 9.7667E−02 |
| S9 | −2.6680E−02 | −3.9090E−02 | 7.7736E−02 | −7.0440E−02 | 3.8227E−02 |
| S10 | −5.8390E−02 | 1.7586E−02 | −3.7641E−02 | 7.1232E−02 | −6.3447E−02 |
| S11 | 1.5434E−02 | −3.7157E−02 | 8.5196E−03 | −1.0513E−03 | 5.5377E−04 |
| S12 | 5.3677E−02 | −3.4663E−02 | −2.3782E−03 | 7.2545E−03 | −3.1028E−03 |
| S13 | 5.3926E−02 | −3.7749E−02 | 1.2702E−02 | −2.2916E−03 | 2.4868E−04 |
| S14 | 2.4232E−03 | −8.1416E−03 | 2.3599E−03 | −3.2842E−04 | 2.0908E−05 |

| Surface number | A14 | A16 | A18 | A20 |
|---|---|---|---|---|
| S1 | −5.5499E−03 | 1.5558E−03 | −2.4257E−04 | 1.5981E−05 |
| S2 | 9.3011E−03 | −2.2421E−03 | 3.0431E−04 | −1.7727E−05 |
| S3 | 1.3043E−03 | 2.9081E−04 | −1.2167E−04 | 1.1921E−05 |
| S4 | −7.9087E−02 | 3.8020E−02 | −9.7523E−03 | 1.0233E−03 |

TABLE 8-continued

| | | | | |
|---|---|---|---|---|
| S5 | −1.5549E−01 | 6.5253E−02 | −1.5367E−02 | 1.5422E−03 |
| S6 | −1.9959E−01 | 1.0129E−01 | −2.8021E−02 | 3.2641E−03 |
| S7 | 4.4420E−01 | −2.1250E−01 | 5.5928E−02 | −6.2443E−03 |
| S8 | −5.6967E−02 | 2.1556E−02 | −4.7157E−03 | 4.4651E−04 |
| S9 | −1.7009E−02 | 6.2522E−03 | −1.4025E−03 | 1.2907E−04 |
| S10 | 3.0002E−02 | −7.8251E−03 | 1.0648E−03 | −5.9145E−05 |
| S11 | −3.9792E−04 | 1.1765E−04 | −1.4888E−05 | 6.8341E−07 |
| S12 | 6.7726E−04 | −8.0450E−05 | 4.8031E−06 | −1.0761E−07 |
| S13 | −1.6817E−05 | 6.9427E−07 | −1.5961E−08 | 1.5520E−10 |
| S14 | −8.2856E−08 | −6.4661E−08 | 3.3827E−09 | −5.6270E−11 |

Figure 8A:
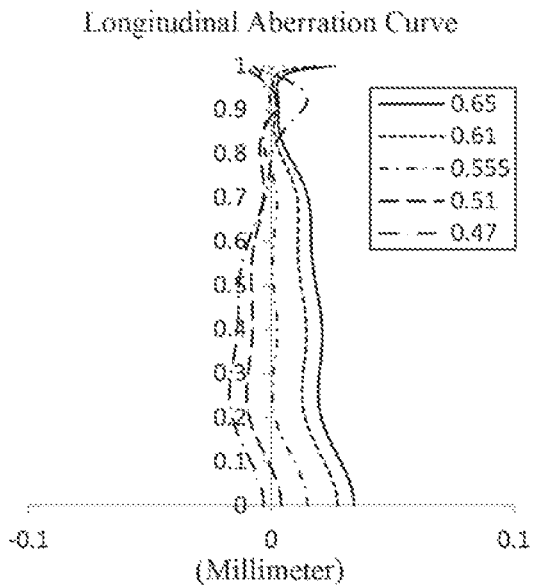
FIGS. 8A to 8D illustrate a longitudinal aberration curve, an astigmatic curve, a distortion curve, and a lateral color curve of the camera lens group of the example 4, respectively.
Figure 8B:
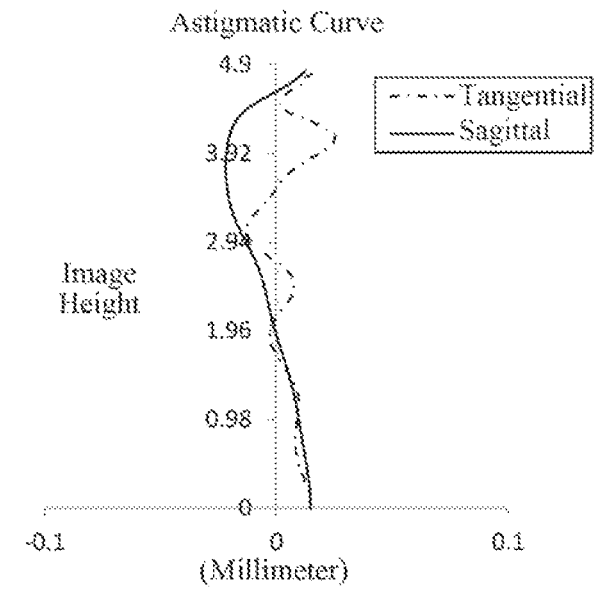
Figure 8C:
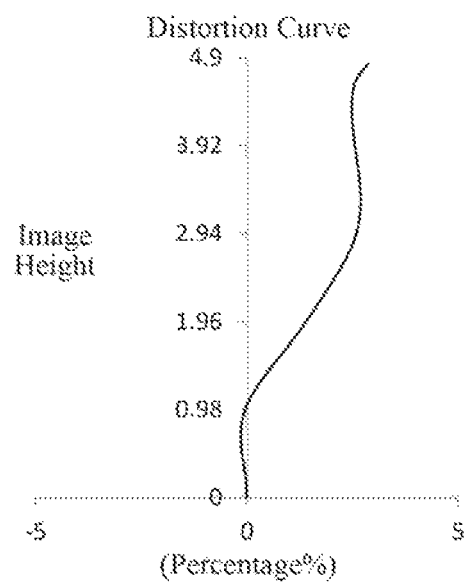
Figure 8D:
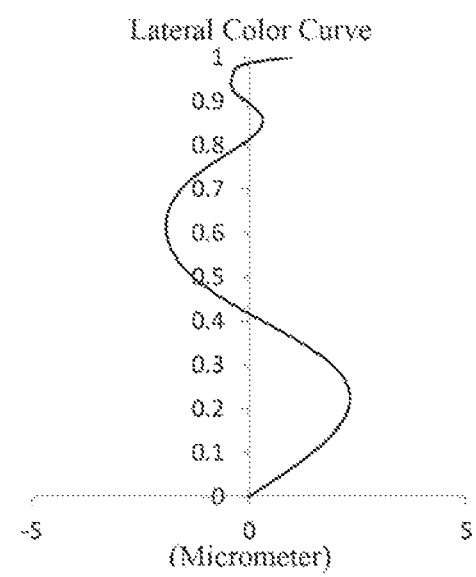

FIG. 8A illustrates a longitudinal aberration curve of the camera lens group according to example 4, representing deviations of focal points converged by light of different wavelengths after passing through the system. FIG. 8B illustrates an astigmatic curve of the camera lens group according to example 4, representing a curvature of a tangential plane and a curvature of a sagittal plane. FIG. 8C illustrates a distortion curve of the camera lens group according to example 4, representing amounts of distortion corresponding to different image heights. FIG. 8D illustrates a lateral color curve of the camera lens group according to example 4, representing deviations of different image heights on an imaging plane after light passes through the system. It can be seen from FIG. 8A to FIG. 8D that the camera lens group provided in example 4 may achieve good image quality.

Example 5

Figure 9:
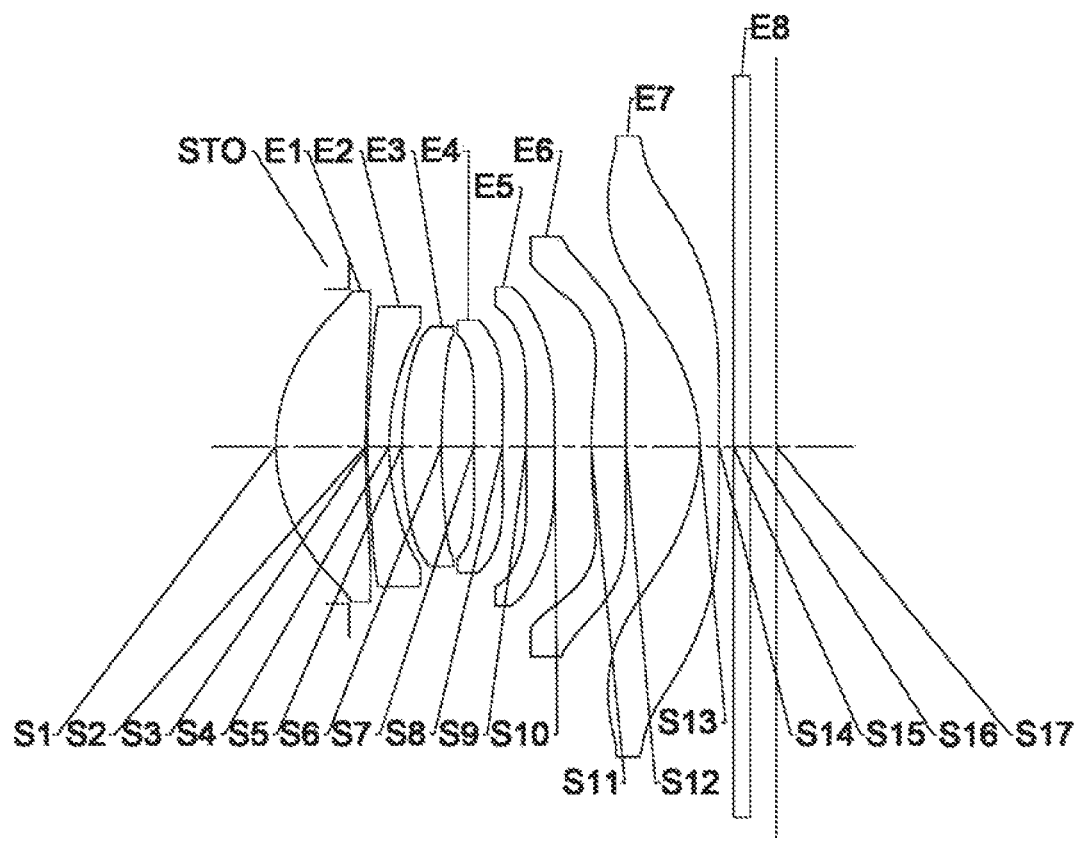
FIG. 9 illustrates a schematic structural view of a camera lens group according to example 5 of the present disclosure.

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is concave. The optical filter E8 has an object-side surface S15 and an image-side surface S16. The camera lens group has an imaging plane S17, and light from an object sequentially passes through the respective surfaces S1 to S16 and is finally imaged on the imaging plane S17.

In example 5, a total effective focal length f of the camera lens group is 5.48 mm, a distance TTL along the optical axis from the object-side surface S1 of the first lens E1 to the imaging plane S17 is 6.28 mm, half of a diagonal length ImgH of an effective pixel area on the imaging plane S17 is 4.84 mm, and half of a maximum field-of-view Semi-FOV is 40.8°.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.9167 | | | | |
| S1 | Aspheric | 2.2407 | 1.1202 | 1.55 | 56.1 | 4.90 | −0.1126 |
| S2 | Aspheric | 11.3420 | 0.0300 | | | | −24.7519 |
| S3 | Aspheric | 7.5440 | 0.2700 | 1.62 | 23.5 | −7.97 | 0.5041 |
| S4 | Aspheric | 3.0123 | 0.1606 | | | | −0.1517 |
| S5 | Aspheric | 4.3692 | 0.4964 | 1.55 | 56.1 | 15.41 | 2.4146 |
| S6 | Aspheric | 8.7241 | 0.4061 | | | | 31.6638 |
| S7 | Aspheric | 17.6086 | 0.3597 | 1.62 | 23.5 | 999.98 | −44.4981 |
| S8 | Aspheric | 17.9582 | 0.2966 | | | | −22.3448 |
| S9 | Aspheric | 21.6132 | 0.3579 | 1.55 | 56.1 | 34.82 | −91.2954 |
| S10 | Aspheric | −156.8504 | 0.4572 | | | | −99.0000 |
| S11 | Aspheric | 6.6484 | 0.4352 | 1.62 | 23.5 | 8.57 | −0.5604 |
| S12 | Aspheric | −31.7713 | 0.9300 | | | | −99.0000 |
| S13 | Aspheric | −1.9432 | 0.2400 | 1.55 | 56.1 | −3.56 | −1.3314 |
| S14 | Aspheric | 5522.6863 | 0.1829 | | | | 99.0000 |
| S15 | Spherical | Infinite | 0.2100 | 1.52 | 64.2 | | |
| S16 | Spherical | Infinite | 0.3272 | | | | |
| S17 | Spherical | Infinite | | | | | |

TABLE 10

| Surface number | A4 | A6 | A8 | A10 | A12 |
|---|---|---|---|---|---|
| S1 | 2.1902E−03 | −8.0453E−03 | 1.5747E−02 | −1.8052E−02 | 1.2684E−02 |
| S2 | 2.8453E−03 | −2.1259E−03 | −1.7670E−02 | 2.6099E−02 | −1.8127E−02 |
| S3 | −1.6490E−02 | 2.8810E−03 | −8.0546E−03 | 7.2989E−03 | −5.4805E−04 |
| S4 | −2.0543E−02 | 8.5332E−03 | 2.1254E−02 | −6.6768E−02 | 9.2324E−02 |
| S5 | −2.6375E−03 | −4.1481E−02 | 1.3112E−01 | −2.2028E−01 | 2.2792E−01 |
| S6 | −1.0933E−02 | −1.7553E−02 | 8.6174E−02 | −2.0904E−01 | 2.9437E−01 |
| S7 | −4.8388E−02 | 5.0779E−02 | −1.9933E−01 | 4.0339E−01 | −5.0345E−01 |
| S8 | −2.9929E−02 | −4.7577E−02 | 1.1422E−01 | −1.7989E−01 | 1.7279E−01 |
| S9 | −2.8818E−02 | −2.4288E−02 | 4.6047E−02 | −4.0714E−02 | 2.2795E−02 |
| S10 | −5.3717E−02 | 2.7570E−02 | −6.4552E−02 | 9.5491E−02 | −7.5282E−02 |
| S11 | 1.1679E−02 | −3.8940E−02 | 1.2493E−02 | −3.6324E−03 | 1.6832E−03 |
| S12 | 5.2459E−02 | −3.7805E−02 | 3.2307E−03 | 3.8673E−03 | −1.9392E−03 |
| S13 | 5.8143E−02 | −4.1136E−02 | 1.3838E−02 | −2.5068E−03 | 2.7407E−04 |
| S14 | 2.7127E−03 | −9.0267E−03 | 2.5664E−03 | −3.3943E−04 | 1.9156E−05 |

| Surface number | A14 | A16 | A18 | A20 |
|---|---|---|---|---|
| S1 | −5.5899E−03 | 1.5031E−03 | −2.2594E−04 | 1.4418E−05 |
| S2 | 7.3875E−03 | −1.8188E−03 | 2.5070E−04 | −1.4809E−05 |
| S3 | −1.9852E−03 | 1.0757E−03 | −2.3062E−04 | 1.8564E−05 |
| S4 | −7.1985E−02 | 3.2879E−02 | −8.1341E−03 | 8.3119E−04 |
| S5 | −1.4832E−01 | 5.9886E−02 | −1.3620E−02 | 1.3266E−03 |
| S6 | −2.4886E−01 | 1.2463E−01 | −3.3990E−02 | 3.8995E−03 |
| S7 | 3.8539E−01 | −1.7733E−01 | 4.5124E−02 | −4.8938E−03 |
| S8 | −1.0671E−01 | 4.1206E−02 | −8.9709E−03 | 8.3561E−04 |
| S9 | −1.2300E−02 | 5.4614E−03 | −1.3449E−03 | 1.2861E−04 |
| S10 | 3.3405E−02 | −8.3797E−03 | 1.1090E−03 | −6.0267E−05 |
| S11 | −7.7316E−04 | 1.9964E−04 | −2.4632E−05 | 1.1512E−06 |
| S12 | 4.3324E−04 | −5.0619E−05 | 2.9145E−06 | −6.2039E−08 |
| S13 | −1.8730E−05 | 7.8407E−07 | −1.8354E−08 | 1.8279E−10 |
| S14 | 2.3129E−07 | −8.5694E−08 | 4.0628E−09 | −6.5173E−11 |

Figure 10A:
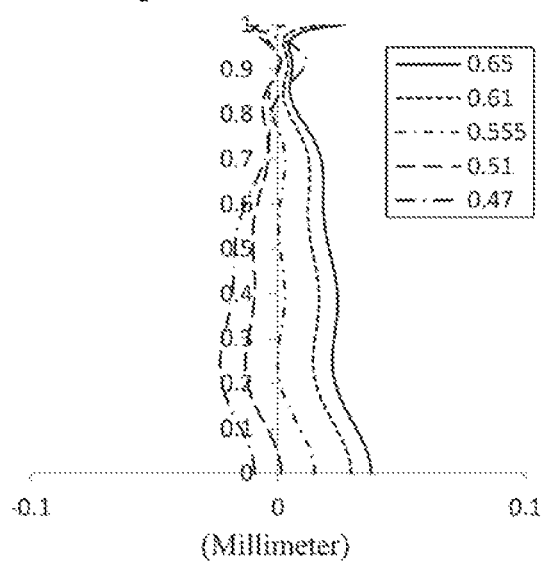
FIGS. 10A to 10D illustrate a longitudinal aberration curve, an astigmatic curve, a distortion curve, and a lateral color curve of the camera lens group of the example 5, respectively.
Figure 10B:
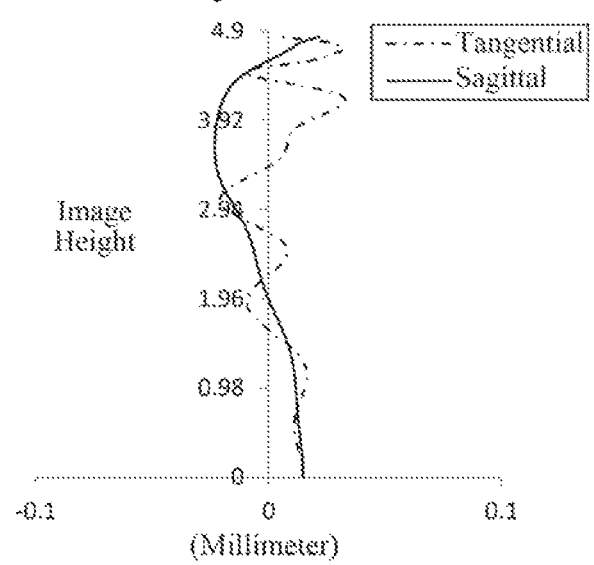
Figure 10C:
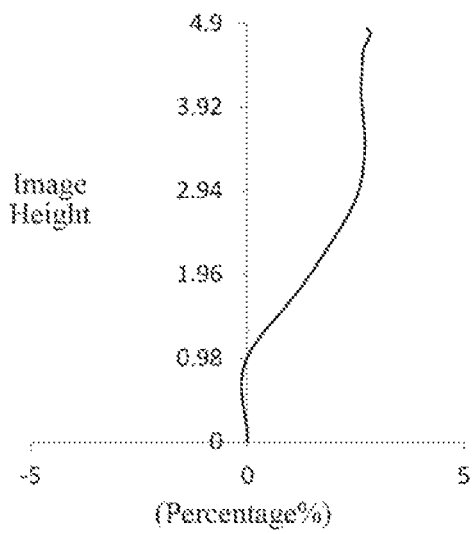
Figure 10D:
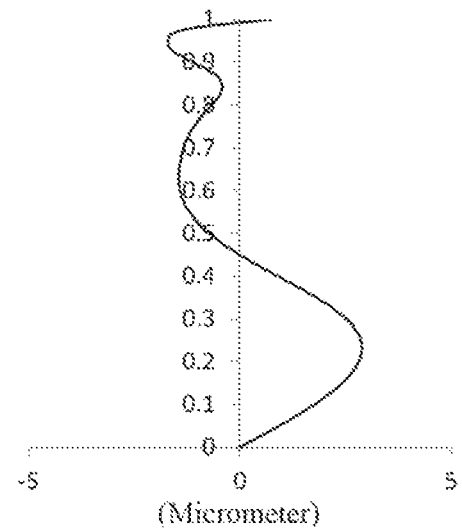

FIG. 10A illustrates a longitudinal aberration curve of the camera lens group according to example 5, representing deviations of focal points converged by light of different wavelengths after passing through the system. FIG. 10B illustrates an astigmatic curve of the camera lens group according to example 5, representing a curvature of a tangential plane and a curvature of a sagittal plane. FIG. 10C illustrates a distortion curve of the camera lens group according to example 5, representing amounts of distortion corresponding to different image heights. FIG. 10D illustrates a lateral color curve of the camera lens group according to example 5, representing deviations of different image heights on an imaging plane after light passes through the system. It can be seen from FIG. 10A to FIG. 10D that the camera lens group provided in example 5 may achieve good image quality.

Example 6

Figure 11:
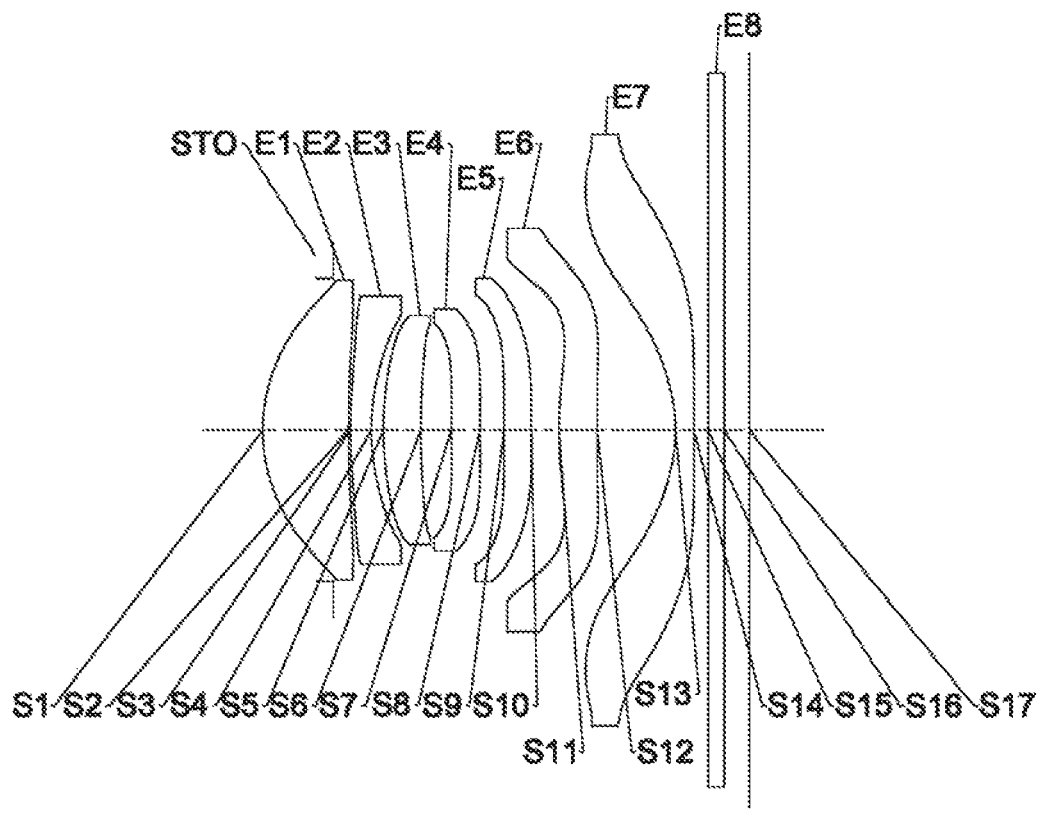
FIG. 11 illustrates a schematic structural view of a camera lens group according to example 6 of the present disclosure.

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is convex. The optical filter E8 has an object-side surface S15 and an image-side surface S16. The camera lens group has an imaging plane S17, and light from an object sequentially passes through the respective surfaces S1 to S16 and is finally imaged on the imaging plane S17.

In example 6, a total effective focal length f of the camera lens group is 5.47 mm, a distance TTL along the optical axis from the object-side surface S1 of the first lens E1 to the imaging plane S17 is 6.33 mm, half of a diagonal length ImgH of an effective pixel area on the imaging plane S17 is 4.85 mm, and half of a maximum field-of-view Semi-FOV is 40.9°.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9167 | | | | |
| S1 | Aspheric | 2.2600 | 1.1116 | 1.55 | 56.1 | 4.84 | −0.1050 |
| S2 | Aspheric | 12.8726 | 0.0300 | | | | −16.0712 |
| S3 | Aspheric | 7.4548 | 0.2700 | 1.62 | 23.5 | −7.69 | −0.4145 |
| S4 | Aspheric | 2.9339 | 0.1572 | | | | −0.2945 |
| S5 | Aspheric | 4.5798 | 0.4863 | 1.55 | 56.1 | 14.69 | 2.9195 |
| S6 | Aspheric | 10.2775 | 0.3979 | | | | 35.0754 |
| S7 | Aspheric | 29.5527 | 0.3724 | 1.62 | 23.5 | 346.56 | −84.0695 |
| S8 | Aspheric | 33.8903 | 0.3121 | | | | 49.9210 |
| S9 | Aspheric | 39.5336 | 0.3539 | 1.55 | 56.1 | −2040.47 | 99.0000 |
| S10 | Aspheric | 38.0579 | 0.3596 | | | | −99.0000 |
| S11 | Aspheric | 5.1960 | 0.4996 | 1.62 | 23.5 | 7.35 | −2.0492 |
| S12 | Aspheric | −51.5519 | 1.0194 | | | | −62.4746 |
| S13 | Aspheric | −2.0012 | 0.2400 | 1.55 | 56.1 | −3.72 | −1.2980 |
| S14 | Aspheric | −138.0297 | 0.1830 | | | | −70.2386 |
| S15 | Spherical | Infinite | 0.2100 | 1.52 | 64.2 | | |
| S16 | Spherical | Infinite | 0.3270 | | | | |
| S17 | Spherical | Infinite | | | | | |

TABLE 12

| Surface number | A4 | A6 | A8 | A10 | A12 |
|---|---|---|---|---|---|
| S1 | 2.6677E−03 | −9.6242E−03 | 1.9441E−02 | −2.2800E−02 | 1.6328E−02 |
| S2 | 2.7024E−03 | −1.0187E−02 | 3.1852E−03 | 4.5835E−03 | −5.6770E−03 |
| S3 | −1.6776E−02 | −1.0610E−02 | 2.1185E−02 | −2.0621E−02 | 1.4380E−02 |
| S4 | −1.8905E−02 | 4.9948E−03 | 1.2281E−02 | −3.5495E−02 | 5.3218E−02 |
| S5 | 1.1866E−03 | −3.4671E−02 | 1.0116E−01 | −1.7292E−01 | 1.8838E−01 |
| S6 | −6.8759E−03 | −1.9271E−02 | 8.2159E−02 | −1.8915E−01 | 2.5790E−01 |
| S7 | −4.5073E−02 | 3.6452E−02 | −1.5260E−01 | 3.0492E−01 | −3.8314E−01 |
| S8 | −3.1117E−02 | −3.3380E−02 | 8.8875E−02 | −1.5727E−01 | 1.6127E−01 |
| S9 | −4.7509E−02 | 1.4524E−02 | 3.9403E−03 | −5.0210E−03 | −2.4553E−03 |
| S10 | −8.0690E−02 | 4.3966E−02 | −5.8659E−02 | 7.5800E−02 | −5.7804E−02 |
| S11 | −1.4321E−04 | −3.7673E−02 | 1.9454E−02 | −1.0175E−02 | 4.7699E−03 |
| S12 | 5.0570E−02 | −3.9420E−02 | 8.8335E−03 | −2.8994E−04 | −2.8874E−04 |
| S13 | 5.2774E−02 | −3.6251E−02 | 1.1903E−02 | −2.0989E−03 | 2.2296E−04 |
| S14 | 3.8054E−03 | −8.2390E−03 | 1.9784E−03 | −1.9123E−04 | 7.4194E−07 |

| Surface number | A14 | A16 | A18 | A20 |
|---|---|---|---|---|
| S1 | −7.2833E−03 | 1.9700E−03 | −2.9601E−04 | 1.8812E−05 |
| S2 | 2.9301E−03 | −8.2183E−04 | 1.2104E−04 | −7.2422E−06 |
| S3 | −6.7578E−03 | 1.9873E−03 | −3.2868E−04 | 2.3394E−05 |
| S4 | −4.6916E−02 | 2.4373E−02 | −6.7432E−03 | 7.5325E−04 |
| S5 | −1.3162E−01 | 5.7586E−02 | −1.4147E−02 | 1.4741E−03 |
| S6 | −2.1248E−01 | 1.0411E−01 | −2.7806E−02 | 3.1272E−03 |
| S7 | 2.9793E−01 | −1.3983E−01 | 3.6392E−02 | −4.0433E−03 |
| S8 | −1.0322E−01 | 4.0627E−02 | −8.9367E−03 | 8.3788E−04 |
| S9 | 1.7493E−03 | 2.2895E−04 | −2.5348E−04 | 3.4067E−05 |
| S10 | 2.5137E−02 | −6.1803E−03 | 8.0000E−04 | −4.2441E−05 |
| S11 | −1.6152E−03 | 3.2774E−04 | −3.4198E−05 | 1.3969E−06 |
| S12 | 4.6077E−05 | 2.2734E−06 | −9.5843E−07 | 5.5286E−08 |
| S13 | −1.4767E−05 | 5.9646E−07 | −1.3373E−08 | 1.2589E−10 |
| S14 | 1.4500E−06 | −1.2697E−07 | 4.6235E−09 | −6.4946E−11 |

Figure 12A:
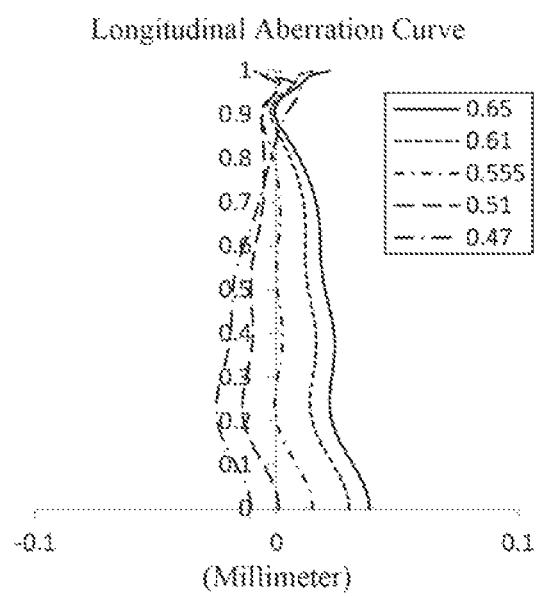
FIGS. 12A to 12D illustrate a longitudinal aberration curve, an astigmatic curve, a distortion curve, and a lateral color curve of the camera lens group of the example 6, respectively.
Figure 12B:
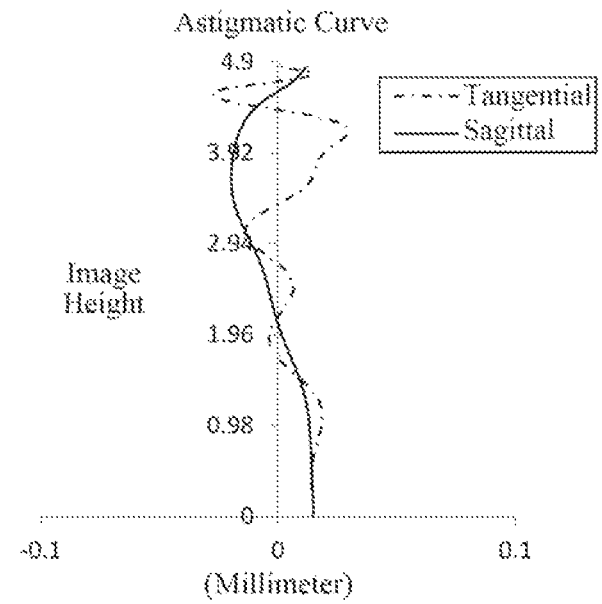
Figure 12C:
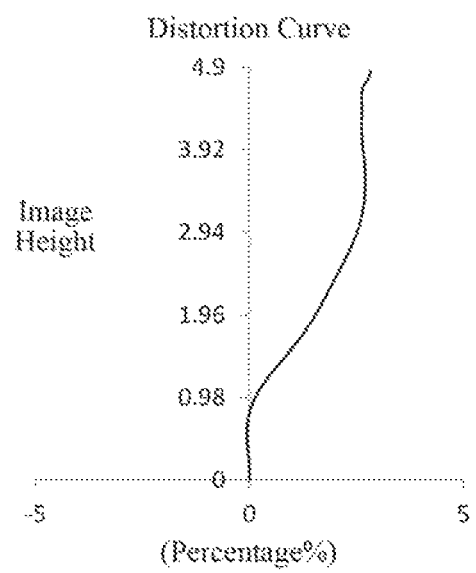
Figure 12D:
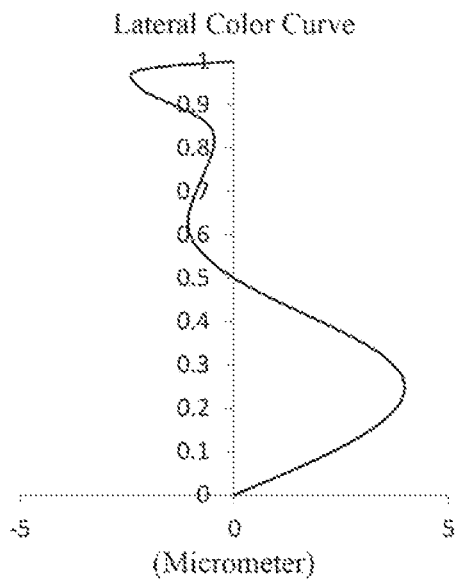

FIG. 12A illustrates a longitudinal aberration curve of the camera lens group according to example 6, representing deviations of focal points converged by light of different wavelengths after passing through the system. FIG. 12B illustrates an astigmatic curve of the camera lens group according to example 6, representing a curvature of a tangential plane and a curvature of a sagittal plane. FIG. 12C illustrates a distortion curve of the camera lens group according to example 6, representing amounts of distortion corresponding to different image heights. FIG. 12D illustrates a lateral color curve of the camera lens group according to example 6, representing deviations of different image heights on an imaging plane after light passes through the system. It can be seen from FIG. 12A to FIG. 12D that the camera lens group provided in example 6 may achieve good image quality.

Example 7

Figure 13:
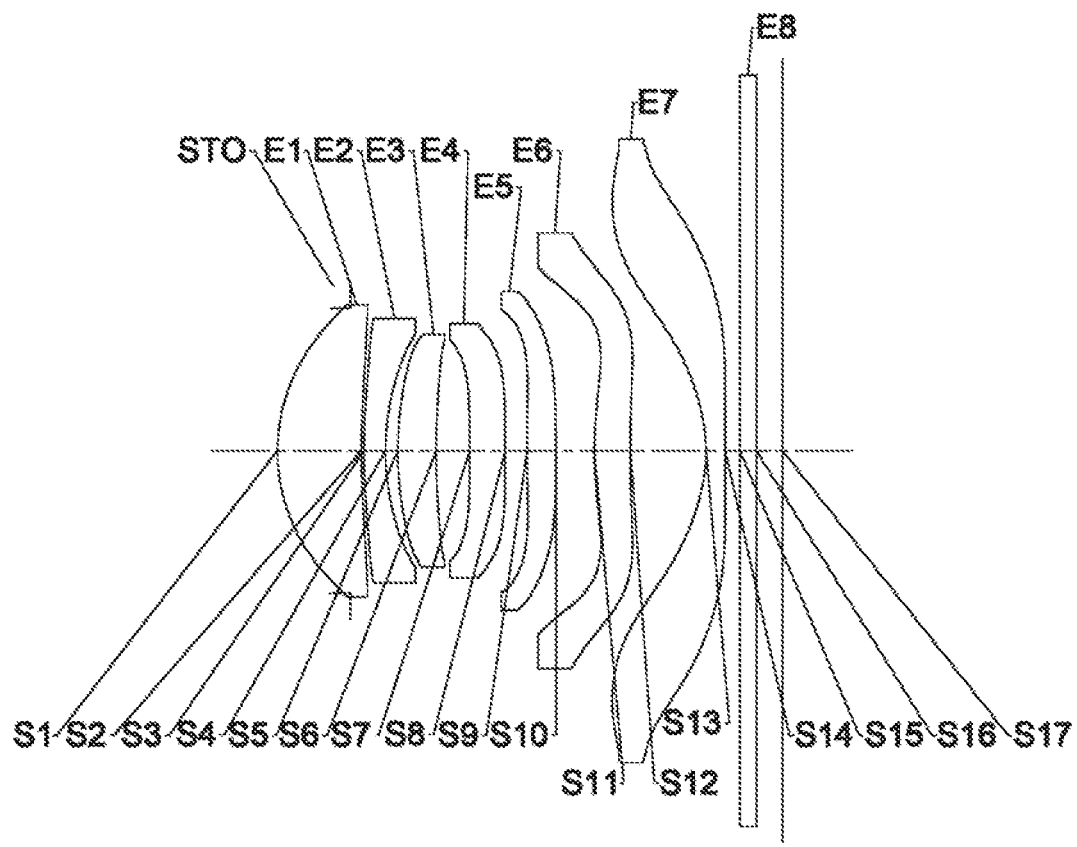
FIG. 13 illustrates a schematic structural view of a camera lens group according to example 7 of the present disclosure.

A camera lens group according to example 7 of the present disclosure is described below with reference to FIG. 13 to FIG. 14D. FIG. 13 shows a schematic structural view of the camera lens group according to example 7 of the present disclosure.

As shown in FIG. 13, the camera lens group includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is concave, and an image-side surface S8 thereof is convex. The fifth lens E5 has positive refractive power, an object-side surface S9 thereof is convex, and an image-side surface S10 thereof is concave. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is convex. The optical filter E8 has an object-side surface S15 and an image-side surface S16. The camera lens group has an imaging plane S17, and light from an object sequentially passes through the respective surfaces S1 to S16 and is finally imaged on the imaging plane S17.

In example 7, a total effective focal length f of the camera lens group is 5.46 mm, a distance TTL along the optical axis from the object-side surface S1 of the first lens E1 to the imaging plane S17 is 6.35 mm, half of a diagonal length ImgH of an effective pixel area on the imaging plane S17 is 4.90 mm, and half of a maximum field-of-view Semi-FOV is 41.3°.

Table 13 is a table illustrating basic parameters of the camera lens group of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9167 | | | | |
| S1 | Aspheric | 2.2580 | 1.0563 | 1.55 | 56.1 | 4.96 | −0.0977 |
| S2 | Aspheric | 11.3706 | 0.0309 | | | | −19.2346 |
| S3 | Aspheric | 7.3833 | 0.2700 | 1.62 | 23.5 | −7.89 | 0.8033 |
| S4 | Aspheric | 2.9687 | 0.1550 | | | | −0.0733 |
| S5 | Aspheric | 4.3669 | 0.4828 | 1.55 | 56.1 | 14.04 | 2.2750 |
| S6 | Aspheric | 9.7522 | 0.4230 | | | | 28.7523 |
| S7 | Aspheric | −65.9885 | 0.4446 | 1.62 | 23.5 | −109.63 | 99.0000 |
| S8 | Aspheric | −1000.0000 | 0.2754 | | | | −99.0000 |
| S9 | Aspheric | 13.8971 | 0.3623 | 1.55 | 56.1 | 25.94 | −22.5466 |
| S10 | Aspheric | 741.0025 | 0.4848 | | | | 99.0000 |
| S11 | Aspheric | 5.4264 | 0.4538 | 1.62 | 23.5 | 8.71 | −2.4182 |
| S12 | Aspheric | 156.0665 | 0.9511 | | | | −99.0000 |
| S13 | Aspheric | −1.9477 | 0.2400 | 1.55 | 56.1 | −3.58 | −1.3152 |
| S14 | Aspheric | −507.6326 | 0.1830 | | | | 99.0000 |
| S15 | Spherical | Infinite | 0.2100 | 1.52 | 64.2 | | |
| S16 | Spherical | Infinite | 0.3272 | | | | |
| S17 | Spherical | Infinite | | | | | |

TABLE 14

| Surface number | A4 | A6 | A8 | A10 | A12 |
|---|---|---|---|---|---|
| S1 | 1.4576E−03 | −3.1426E−03 | 6.0576E−03 | −7.1198E−03 | 5.3110E−03 |
| S2 | 9.8949E−03 | −2.9929E−02 | 2.5402E−02 | −7.9477E−03 | −3.6447E−03 |
| S3 | −5.9927E−03 | −4.2913E−02 | 7.1871E−02 | −7.1193E−02 | 4.7883E−02 |
| S4 | −1.7496E−02 | 3.9020E−03 | 5.6636E−03 | −1.5457E−02 | 2.8489E−02 |
| S5 | −1.9459E−03 | −2.8433E−02 | 8.2967E−02 | −1.4147E−01 | 1.5377E−01 |
| S6 | −6.8048E−03 | −1.4247E−02 | 5.2231E−02 | −1.1688E−01 | 1.5947E−01 |
| S7 | −4.0872E−02 | 2.4784E−02 | −1.1834E−01 | 2.4087E−01 | −3.0521E−01 |
| S8 | −3.3524E−02 | −2.0378E−02 | 4.7241E−02 | −8.4601E−02 | 8.6687E−02 |
| S9 | −3.9199E−02 | 2.4985E−02 | −3.9039E−02 | 4.9512E−02 | −4.2436E−02 |
| S10 | −5.4833E−02 | 3.4504E−02 | −5.4234E−02 | 6.7354E−02 | −4.9358E−02 |
| S11 | 5.0455E−03 | −2.9325E−02 | 9.7458E−03 | −4.9777E−03 | 3.1239E−03 |
| S12 | 4.6829E−02 | −3.1091E−02 | 2.3002E−04 | 4.5859E−03 | −1.9830E−03 |
| S13 | 5.9326E−02 | −4.2953E−02 | 1.4801E−02 | −2.7747E−03 | 3.1750E−04 |
| S14 | 8.2081E−03 | −1.2844E−02 | 4.0623E−03 | −7.0108E−04 | 7.4838E−05 |

| Surface number | A14 | A16 | A18 | A20 |
|---|---|---|---|---|
| S1 | −2.5524E−03 | 7.5938E−04 | −1.2748E−04 | 9.0458E−06 |
| S2 | 4.5782E−03 | −1.8906E−03 | 3.7042E−04 | −2.8701E−05 |
| S3 | −2.1321E−02 | 5.9558E−03 | −9.4160E−04 | 6.4290E−05 |
| S4 | −2.9359E−02 | 1.7004E−02 | −5.0676E−03 | 5.9501E−04 |

TABLE 14-continued

| | | | | |
|---|---|---|---|---|
| S5 | −1.0681E−01 | 4.6661E−02 | −1.1530E−02 | 1.2176E−03 |
| S6 | −1.3400E−01 | 6.7867E−02 | −1.8872E−02 | 2.2180E−03 |
| S7 | 2.3867E−01 | −1.1282E−01 | 2.9636E−02 | −3.3356E−03 |
| S8 | −5.5152E−02 | 2.1568E−02 | −4.7149E−03 | 4.3926E−04 |
| S9 | 2.0799E−02 | −5.6249E−03 | 7.8797E−04 | −4.5835E−05 |
| S10 | 2.0863E−02 | −5.0160E−03 | 6.3721E−04 | −3.3250E−05 |
| S11 | −1.2763E−03 | 2.8403E−04 | −3.1471E−05 | 1.3651E−06 |
| S12 | 4.1937E−04 | −4.8490E−05 | 2.9088E−06 | −7.0422E−08 |
| S13 | −2.2997E−05 | 1.0350E−06 | −2.6506E−08 | 2.9562E−10 |
| S14 | −5.1798E−06 | 2.3236E−07 | −6.2080E−09 | 7.4452E−11 |

Figure 14A:
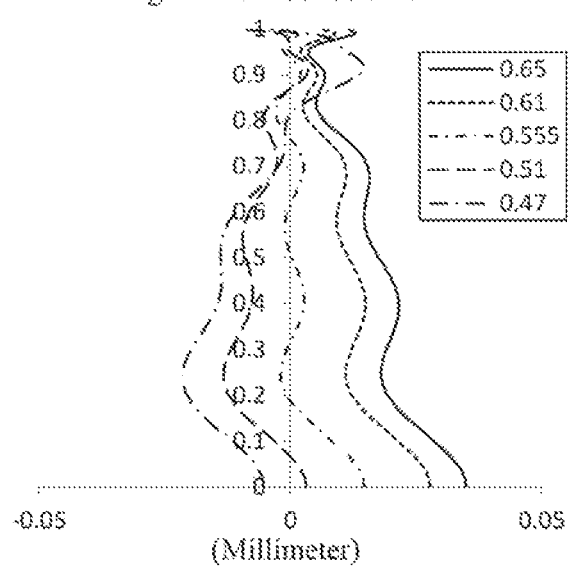
FIGS. 14A to 14D illustrate a longitudinal aberration curve, an astigmatic curve, a distortion curve, and a lateral color curve of the camera lens group of the example 7, respectively.
Figure 14B:
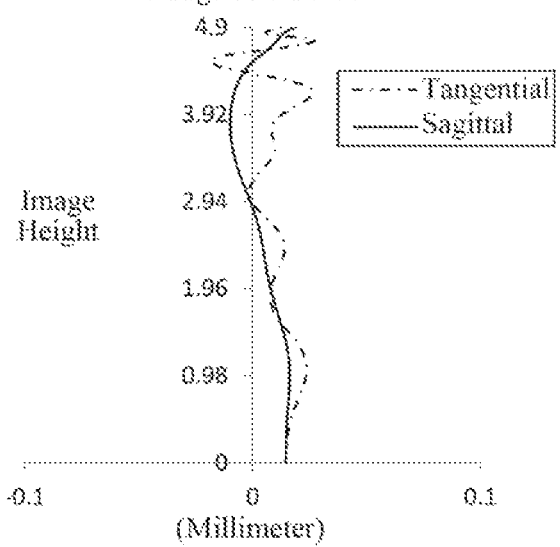
Figure 14C:
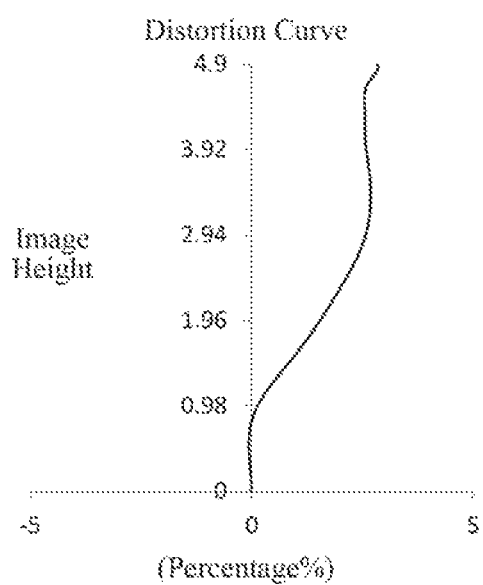
Figure 14D:
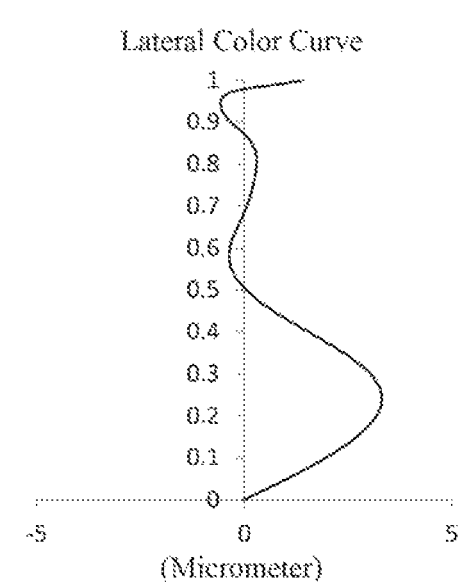

FIG. 14A illustrates a longitudinal aberration curve of the camera lens group according to example 7, representing deviations of focal points converged by light of different wavelengths after passing through the system. FIG. 14B illustrates an astigmatic curve of the camera lens group according to example 7, representing a curvature of a tangential plane and a curvature of a sagittal plane. FIG. 14C illustrates a distortion curve of the camera lens group according to example 7, representing amounts of distortion corresponding to different image heights. FIG. 14D illustrates a lateral color curve of the camera lens group according to example 7, representing deviations of different image heights on an imaging plane after light passes through the system. It can be seen from FIG. 14A to FIG. 14D that the camera lens group provided in example 7 may achieve good image quality.

In view of the above, examples 1 to 7 respectively satisfy the relationship shown in Table 15.

TABLE 15

| Condition/Example | 1 | 2 | 3 | 4 | 5 | 6 | 7 |
|---|---|---|---|---|---|---|---|
| Fno | 1.50 | 1.51 | 1.52 | 1.50 | 1.49 | 1.50 | 1.53 |
| TTL/ImgH | 1.30 | 1.30 | 1.30 | 1.30 | 1.30 | 1.31 | 1.30 |
| f3/f*ImgH (mm) | 12.63 | 12.60 | 12.60 | 12.46 | 11.93 | 13.61 | 13.02 | 12.60 |
| f34/BFL | 24.60 | 25.31 | 24.74 | 32.81 | 20.94 | 19.54 | 22.14 |
| R2/f1 | 2.32 | 2.37 | 2.27 | 2.15 | 2.31 | 2.66 | 2.29 |
| (R6 + R5)/(R6 − R5) | 2.74 | 2.73 | 2.73 | 2.65 | 3.01 | 2.61 | 2.62 |
| ΣAT/TD | 0.41 | 0.41 | 0.41 | 0.42 | 0.41 | 0.41 | 0.41 |
| T67/CT6 | 2.14 | 2.16 | 2.09 | 2.74 | 2.14 | 2.04 | 2.10 |
| (SAG51 + SAG52)/(SAG52 − SAG51) | 6.01 | 5.92 | 5.73 | 6.11 | 5.92 | 5.81 | 4.96 |
| (SAG31 + SAG32)/(SAG31 − SAG32) | 2.28 | 2.27 | 2.26 | 2.16 | 2.43 | 2.16 | 2.07 |
| (DT11 + DT62)/(DT62 − DT11) | 5.74 | 6.08 | 6.20 | 7.27 | 6.70 | 6.76 | 5.08 |
| (DT71 + DT72)/(DT72 − DT71) | 19.64 | 21.39 | 64.15 | 47.17 | 51.53 | 48.43 | 50.28 |
| ET6/ET7 | 0.90 | 0.90 | 1.59 | 0.88 | 1.29 | 1.26 | 1.41 |

The present disclosure further provides an imaging apparatus, which is provided with an electronic photosensitive element for imaging, and the electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
   a stop;
   a first lens having positive refractive power;
   a second lens having negative refractive power;
   a third lens having positive refractive power;
   a fourth lens having refractive power;
   a fifth lens having refractive power;
   a sixth lens having positive refractive power; and
   a seventh lens having negative refractive power,
   wherein $Fno \leq 1.53$, $TTL/ImgH \leq 1.31$, $2.00 < R2/f1 < 3.00$, and $11.50 \text{ mm} < f3/f*ImgH < 14.00 \text{ mm}$, where Fno is an aperture number of the camera lens group, TTL is a distance along the optical axis from an object-side surface of the first lens to an imaging plane of the camera lens group, ImgH is half of a diagonal length of an effective pixel area on the imaging plane of the camera lens group, f3 is an effective focal length of the third lens, and f is a total effective focal length of the camera lens group, R2 is a radius of curvature of an image-side surface of the first lens, and f1 is an effective focal length of the first lens.

2. The camera lens group according to claim 1, wherein $19.00 < f34/BFL < 33.00$,
   where f34 is a combined focal length of the third lens and the fourth lens, and BFL is an optical back focus of the camera lens group.

3. The camera lens group according to claim 1, wherein $2.00 < (R6+R5)/(R6−R5) < 3.50$,
   where R5 is a radius of curvature of an object-side surface of the third lens, and R6 is a radius of curvature of an image-side surface of the third lens.

4. The camera lens group according to claim 1, wherein ΣAT/TD≤0.42,
where TD is a distance along the optical axis from the object-side surface of the first lens to an image-side surface of the seventh lens, and ΣAT is a sum of spaced intervals along the optical axis between each two adjacent lenses of the first lens to the seventh lens.

5. The camera lens group according to claim 1, wherein 2.00<T67/CT6<3.00,
where CT6 is a center thickness of the sixth lens along the optical axis, and T67 is a spaced interval between the sixth lens and the seventh lens along the optical axis.

6. The camera lens group according to claim 1, wherein 4.50<(SAG51+SAG52)/(SAG52−SAG51)<6.50,
where SAG51 is an on-axis distance from an intersection of an object-side surface of the fifth lens and the optical axis to a vertex of an effective radius of the object-side surface of the fifth lens, and SAG52 is an on-axis distance from an intersection of an image-side surface of the fifth lens and the optical axis to a vertex of an effective radius of the image-side surface of the fifth lens.

7. The camera lens group according to claim 1, wherein 2.00<(SAG31+SAG32)/(SAG31−SAG32)<2.50,
where SAG31 is an on-axis distance from an intersection of an object-side surface of the third lens and the optical axis to a vertex of an effective radius of the object-side surface of the third lens, and SAG32 is an on-axis distance from an intersection of an image-side surface of the third lens and the optical axis to a vertex of an effective radius of the image-side surface of the third lens.

8. The camera lens group according to claim 1, wherein 5.00<(DT11+DT62)/(DT62−DT11)<7.50,
where DT11 is a maximum effective radius of the object-side surface of the first lens, and DT62 is a maximum effective radius of an image-side surface of the sixth lens.

9. The camera lens group according to claim 1, wherein 19.00<(DT71+DT72)/(DT72−DT71)<65.00,
where DT71 is a maximum effective radius of an object-side surface of the seventh lens, and DT72 is a maximum effective radius of an image-side surface of the seventh lens.

10. The camera lens group according to claim 1, wherein 0.50<ET6/ET7<2.00,
where ET6 is an edge thickness of the sixth lens, and ET7 is an edge thickness of the seventh lens.

11. A camera lens group, sequentially from an object side to an image side of the camera lens group along an optical axis, comprising:
a stop;
a first lens having positive refractive power;
a second lens having negative refractive power;
a third lens having positive refractive power;
a fourth lens having refractive power;
a fifth lens having refractive power;
a sixth lens having positive refractive power; and
a seventh lens having negative refractive power, wherein $Fno \leq 1.53$, $TTL/ImgH \leq 1.31$, $2.00 < T67/CT6 < 3.00$, and $11.50 \text{ mm} < f3/f*ImgH < 14.00 \text{ mm}$, where Fno is an aperture number of the camera lens group, TTL is a distance along the optical axis from an object-side surface of the first lens to an imaging plane of the camera lens group, ImgH is half of a diagonal length of an effective pixel area on the imaging plane of the camera lens group, CT6 is a center thickness of the sixth lens along the optical axis, T67 is a spaced interval between the sixth lens and the seventh lens along the optical axis, f3 is an effective focal length of the third lens, and f is a total effective focal length of the camera lens group.

12. The camera lens group according to claim 11, wherein 19.00<f34/BFL<33.00,
where f34 is a combined focal length of the third lens and the fourth lens, and BFL is an optical back focus of the camera lens group.

13. The camera lens group according to claim 11, wherein 2.00<R2/f1<3.00,
where R2 is a radius of curvature of an image-side surface of the first lens, and f1 is an effective focal length of the first lens.

14. The camera lens group according to claim 11, wherein ΣAT/TD≤0.42,
where TD is a distance along the optical axis from the object-side surface of the first lens to an image-side surface of the seventh lens, and ΣAT is a sum of spaced intervals along the optical axis between each two adjacent lenses of the first lens to the seventh lens.

15. The camera lens group according to claim 11, wherein 2.00<T67/CT6≤3.00,
where CT6 is a center thickness of the sixth lens along the optical axis, and T67 is a spaced interval between the sixth lens and the seventh lens along the optical axis.

16. The camera lens group according to claim 11, wherein 4.50<(SAG51+SAG52)/(SAG52−SAG51)<6.50,
where SAG51 is an on-axis distance from an intersection of an object-side surface of the fifth lens and the optical axis to a vertex of an effective radius of the object-side surface of the fifth lens, and SAG52 is an on-axis distance from an intersection of an image-side surface of the fifth lens and the optical axis to a vertex of an effective radius of the image-side surface of the fifth lens.

17. The camera lens group according to claim 11, wherein 2.00<(SAG31+SAG32)/(SAG31−SAG32)<2.50,
where SAG31 is an on-axis distance from an intersection of the object-side surface of the third lens and the optical axis to a vertex of an effective radius of the object-side surface of the third lens, and SAG32 is an on-axis distance from an intersection of the image-side surface of the third lens and the optical axis to a vertex of an effective radius of the image-side surface of the third lens.

18. The camera lens group according to claim 11, wherein 5.00<(DT11+DT62)/(DT62−DT11)<7.50,
where DT11 is a maximum effective radius of the object-side surface of the first lens, and DT62 is a maximum effective radius of an image-side surface of the sixth lens.

19. A camera lens group, sequentially from an object side to an image side of the camera lens group along an optical axis, comprising:
a stop;
a first lens having positive refractive power;
a second lens having negative refractive power;
a third lens having positive refractive power;
a fourth lens having refractive power;
a fifth lens having refractive power;
a sixth lens having positive refractive power; and
a seventh lens having negative refractive power, wherein $Fno \leq 1.53$, $TTL/ImgH \leq 1.31$, $4.50<(SAG51+SAG52)/(SAG52-SAG51)<6.50$, and $11.50 \text{ mm} < f3/f*\text{ImgH} < 14.00 \text{ mm}$, where Fno is an aperture number of the camera lens group, TTL is a distance along the optical axis from an object-side surface of the first lens to an imaging plane of the camera lens group, ImgH is half of a diagonal length of an effective pixel area on the imaging plane of the camera lens group, f3 is an effective focal length of the third lens, f is a total effective focal length of the camera lens group, SAG51 is an on-axis distance from an intersection of an object-side surface of the fifth lens and the optical axis to a vertex of an effective radius of the object-side surface of the fifth lens, and SAG52 is an on-axis distance from an intersection of an image-side surface of the fifth lens and the optical axis to a vertex of an effective radius of the image-side surface of the fifth lens.

\* \* \* \* \*